US011867385B2

(12) United States Patent
Stasiak et al.

(10) Patent No.: US 11,867,385 B2
(45) Date of Patent: Jan. 9, 2024

(54) COB LED LIGHTING LAMP COOLED BY A LIQUID AGENT, IN PARTICULAR WATER

(71) Applicants: Michal Stasiak, Leobersdorf (AT); Piotr Kaluzny, Jaroslaw (PL)

(72) Inventors: Michal Stasiak, Leobersdorf (AT); Piotr Kaluzny, Jaroslaw (PL)

( * ) Notice: Subject to any disclaimer, the term of this patent is extended or adjusted under 35 U.S.C. 154(b) by 0 days.

(21) Appl. No.: 17/758,407

(22) PCT Filed: Dec. 10, 2020

(86) PCT No.: PCT/PL2020/000093
§ 371 (c)(1),
(2) Date: Jul. 6, 2022

(87) PCT Pub. No.: WO2021/141505
PCT Pub. Date: Jul. 15, 2021

(65) Prior Publication Data

US 2023/0028739 A1 Jan. 26, 2023

(30) Foreign Application Priority Data

Jan. 7, 2020 (PL) ........................................ 432506

(51) Int. Cl.
*F21V 29/58* (2015.01)
*F21V 21/096* (2006.01)
(Continued)

(52) U.S. Cl.
CPC ............ *F21V 29/59* (2015.01); *F21V 21/096* (2013.01); *F21V 23/007* (2013.01); (Continued)

(58) Field of Classification Search
CPC ........ F21V 29/59; F21V 29/67; F21V 29/503; F21V 29/56
See application file for complete search history.

(56) References Cited

U.S. PATENT DOCUMENTS

| | | | | |
|---|---|---|---|---|
| 10,718,505 | B2 * | 7/2020 | Di Giovine | F21V 7/0008 |
| 2008/0117637 | A1 | 5/2008 | Chang et al. | |

(Continued)

FOREIGN PATENT DOCUMENTS

| | | |
|---|---|---|
| GB | 2570621 | 8/2019 |
| JP | 2010272472 | 12/2010 |

(Continued)

*Primary Examiner* — William N Harris
(74) *Attorney, Agent, or Firm* — Defillo & Associates, Inc; Evelyn A. Defillo

(57) ABSTRACT

A COB LED lighting lamp cooled by a liquid agent, in particular water, used for year-round illumination of the LED light of this lamp in a greenhouse of plants and includes a load-bearing and lighting component, having a cooling plate with three threaded mounting openings arranged transversely, the inner surface of which with channels for the cooling liquid flowing through it is permanently and tightly connected with a cover equipped with neodymium magnets magnetically connected to contacting neodymium magnets of holders fixing COB LED modules equipped with COB LED diodes and lenses, and a cooling subassembly situated above it, including a cooling fan and a water radiator placed thereon and detachably connected thereto. Both components being connected to each other by two connecting pipe sets, such that the upper connector of the pipe set is screwed into the threaded opening of the water chamber of this water radiator.

8 Claims, 26 Drawing Sheets

(51) Int. Cl.

| | |
|---|---|
| ***F21V 29/507*** | (2015.01) |
| ***F21V 29/57*** | (2015.01) |
| ***F21V 29/67*** | (2015.01) |
| ***F21V 23/00*** | (2015.01) |
| ***F21V 29/503*** | (2015.01) |
| ***F21Y 115/10*** | (2016.01) |

(52) U.S. Cl.

CPC .......... *F21V 29/503* (2015.01); *F21V 29/507* (2015.01); *F21V 29/57* (2015.01); *F21V 29/67* (2015.01); *F21V 23/001* (2013.01); *F21Y 2115/10* (2016.08)

(56) References Cited

U.S. PATENT DOCUMENTS

| | | | | |
|---|---|---|---|---|
| 2011/0037390 | A1* | 2/2011 | Ko | F21V 29/67 315/117 |
| 2015/0308655 | A1* | 10/2015 | Holmes | F21V 29/717 362/294 |
| 2016/0348885 | A1* | 12/2016 | Yang | H05K 7/20281 |
| 2017/0030567 | A1* | 2/2017 | Sun | F21V 29/56 |
| 2018/0295785 | A1* | 10/2018 | Ross | A01G 9/249 |
| 2021/0063007 | A1* | 3/2021 | Khalifa | F21V 29/74 |
| 2021/0229001 | A1* | 7/2021 | Edwards | B01D 19/0052 |

FOREIGN PATENT DOCUMENTS

| | | |
|---|---|---|
| KR | 20160116207 | 10/2016 |
| PL | 221321 | 3/2016 |
| PL | 69364 | 9/2017 |
| WO | WO2012030536 | 3/2012 |
| WO | WO2014126301 | 8/2014 |

* cited by examiner

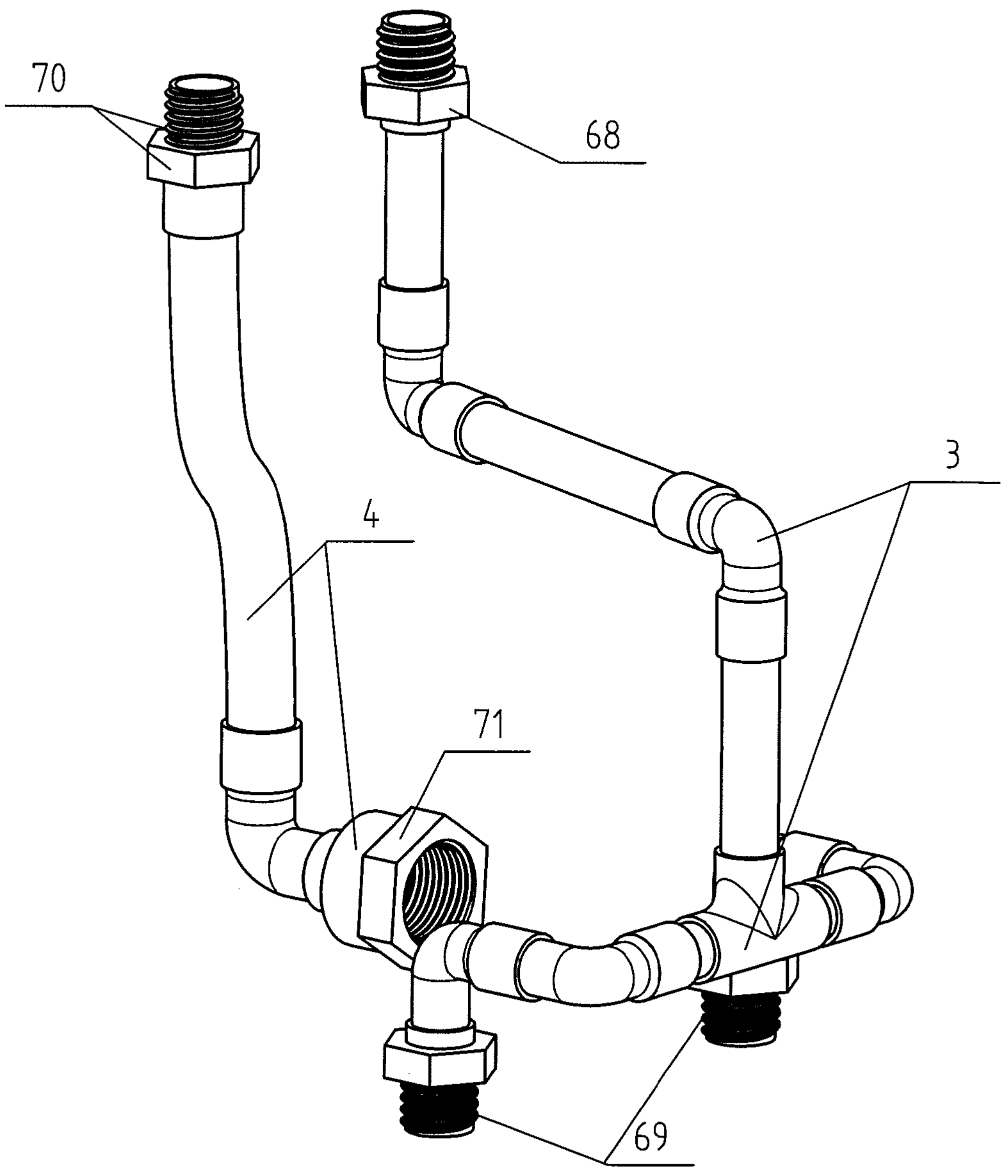
Fig. 8/1

View "K"

C–C

D-D

E-E

COB LED LIGHTING LAMP COOLED BY A LIQUID AGENT, IN PARTICULAR WATER

CROSS REFERENCE TO RELATED APPLICATION

This application is a national stage entry of PCT/PL2020/000093 filed Dec. 10, 2020, under the International Convention and claiming priority over Poland Patent Application No. P.432506 filed Jan. 7, 2020.

FIELD OF THE INVENTION

The subject of the invention is a COB LED lighting lamp cooled by a liquid agent, especially water, used for year-round illumination of plants with LED light of this lamp in a greenhouse.

BACKGROUND OF THE PRIOR ART

It turned out that the light, including LED, like no other type of light, such as HPS, is suitable for growing plants under covers and is also used in light therapy, because in addition to ensuring optimal radiation, it allows for any modification of the percentage of light colors and its wavelengths.

A LED technology allows you to modify the percentages of individual light spectra, selecting the method of exposure to a specific greenhouse plant cultivation, with the possibility of excluding sunlight. COB LEDs stand out from other well-known lamps, especially with fully smooth light and its uniform color. In addition, they are more efficient and consume less electricity and can also be used to illuminate sidewalks, streets, roads, highways and tunnels, and can also be used as hall or building lighting as well as UV light used at mass events.

COB (Chip On Board) LED modules are commonly known and used in LED lighting, in the construction of garden lamps, LED contour lighting and in ceiling lighting as decorative and architectural LEDs. Lamps of this type, using COB diodes, however, require good cooling and are usually screwed permanently to the housing with a heat sink. In addition, they work with the voltage maximum of 24-28 V, because the heat dissipation by the heat sink and the fan alone is not able to cool the system.

The LED lighting lamp known from the Polish patent specification PL 221321 has a rectangular housing, in which four emitters are mounted at the bottom, with the possibility of using one emitter, and four heat sinks are mounted on the four side walls of the housing, each of which is made of plates parallel to each other, plates are made of a material that conducts heat well, and moreover, the heat sink plates are situated perpendicularly to side walls of this housing, each of these emitters is embedded in the housing with the optical system.

From the US patent specification No. US 2008117637, an LED lamp cooling device using a pulse heat pipe to improve light scattering is also known. The device comprises a substrate and a plurality of LEDs electrically connected to this substrate and mounted thereon, and a heat sink for dissipating the heat generated by this LEDs and a pulse heat pipe connected to the heat sink. This pulse pipe is filled with a working fluid and contains several heat receiving parts. The substrate of this device is attached to the heat receiving parts of the pulse heat pipe, and the heat sink is attached to the heat radiating parts of this pulse heat pipe. The heat generated by the LEDs is transferred from the heat receiving parts to the heat radiating parts of the pulse heat pipe, by pulsation or oscillation of the working fluid in the pulse pipe.

From Japanese Patent No. JP2010272472, a LED lighting device is also known, in which the stability of the optical power and the lifetime of the LED is achieved by controlling the excessive temperature rise of the LED lighting to a stable state. The device consists of a lamp part connected to an LED light source, a temperature sensing element and a water-cooled jacket, cooling the LED light source, and a liquid-cooled heat dissipation mechanism, which cools through the radiator cooling the fluid that received heat from the LED light source through the water-cooled jacket. In the lamp portion of this device, the LED light source is driven and controlled by a current based on the temperature detected by the temperature sensing element (sensor), thereby excessive temperature rise during operation of the LED light source is suppressed.

In turn, from the Korean patent KR20160116207, the device is known for cooling a light source body with an LED by means of a heat exchange fluid in a plurality of radiating bodies and a heat exchange fluid, circulating the heat generated from the LED light source body so as to effectively emit heat to the outside of the device. According to this invention, the device comprises a combined element, two radiating bodies, a heat exchange fluid, an accumulation tank and a fluid circulation pump.

Moreover, from the Polish description of the utility model No. PL69364, a device for cooling a high-power LED or LEDs is known, comprising a heat sink and a pipe filled with a liquid receiving heat from this or these LED(s). This device consists of an annular thin-walled pipe with a small amount of a liquid with a low boiling point and low electrical conductivity placed in it, under which the LED substrate in contact with the liquid is mounted in the tube, while, opposite the diode, the pipe is provided with an element adjacent to it, with high thermal conductivity, being in contact with the heat sink. Preferably, in this thin-walled pipe of this device, several LED substrates are mounted in contact with the liquid placed therein with high thermal conductivity, wherein aliphatic hydrocarbons, especially pentane or ethers, including diethyl ether or tert-butyl methyl ether, are used as the liquid placed in the tube, or hexane or acetone or carbon tetrachloride or chloroform are used as the liquid. Preferably, in this device, its pipe is provided only with an element with high thermal conductivity, and the heat sink is provided by the LED lamp luminaire, and this thin-walled pipe has a circular or oval profile.

SUMMARY OF THE INVENTION

The object of the invention is to provide a new, compact lighting structure cooled by a liquid agent, especially water, using the known COB LED module and cheap, readily available liquid cooling agent and eliminating the need for a heat sink.

The COB LED lighting lamp cooled by a liquid agent, in particular water, according to the invention is characterized by the fact that it consists of a load-bearing and lighting subassembly having a cooling plate with three threaded mounting openings arranged transversely in it, the inner surface of which, with channels for flowing through the coolant, is connected permanently and tightly to the cover equipped with neodymium magnets magnetically connected to the contacting neodymium magnets of the holders fixing COB LED modules equipped with COB LED diodes and with lenses and a cooling subassembly located above it, consisting of a cooling fan and a water radiator placed on it and detachably connected thereto.

Both these subassemblies are connected to each other by means of a first connecting pipe set and a second connecting pipe set, so that the upper joint of the first pipe set is screwed into the threaded opening of the water chamber of the water radiator, and both joints of this first pipe set are screwed into the threaded openings of the cooling plate of the load-bearing and lighting subassembly, in the second opening of which a threaded connecting pipe of the water pump is screwed, while the upper joint of the second pipe set is screwed into the threaded opening of the water chamber of the water radiator, and the lower joint of the second pipe set is screwed into the threaded connection pipe of the water pump, wherein both of these subassemblies are mounted in the housing with a profile adapted to the shape of the cooling plate and the water radiator. The cooling plate on its inner surface next to and between its channels has round blind openings with neodymium magnets embedded in them, protruding above the plate surface, on which the cover is mounted through its openings, connected with an adhesive layer to the inner surface of this cooling plate, and the outer surface of the cooling plate cover is covered with a thermally conductive layer.

Both in the cooling plate and in its cover, between the neodymium magnets embedded in them, mounting through openings are made, in which the cables of electrical contact connectors are embedded, the copper contact plates of which adhere to the power boards of COB LED modules embedded in their mounting holders equipped with neodymium magnets, connected with neodymium magnets embedded in the cooling plate and its cover of the load-bearing and lighting subassembly, whereby the connection of these contact plates with the power boards causes the supply of current to these modules and the lighting of their LEDs.

The mounting holders for the COB LED modules have profiles adapted to the profiles of the plates reflecting heat from these modules, covered with a thermally conductive layer on the top, and, in their axes of symmetry, they have through openings located opposite the COB LEDs of these modules, and on one of their surfaces they have profile extractions, in which profile casings of these modules are embedded, and their opposite flat surfaces, on the rounded sides, have two arched offsets each opposite each other, between which the collar offsets of the lens are embedded with a paraboloidal profile scattering or focusing light rays from COB LEDs, and, in addition, each of these holders, in its four corners, has openings with neodymium magnets embedded in them, being in contact with the neodymium magnets of the load-bearing and lighting subassembly. In addition, the housing of the load-bearing and lighting and cooling subassemblies is equipped with power cables connected to an external power supply with an electronic unit and knobs controlling the flow of electric current, and with two displays with panels embedded in them.

Preferably, the cooling plate and its cover are made of aluminium or steel or titanium or carbon or ceramic, copper, epoxy resin or plastic, and the cooling agent is water or glycol or alcohol or oil.

It is also preferred that the thermally conductive layer (23") is a thermally conductive paste or a liquid metal or a silicone thermally conductive mat.

The use of a magnetic connection of the metal cover of the cooling plate with COB LED modules by means of two sets of neodymium magnets allows them to be quickly disconnected from each other and, if necessary, easy replacement of the COB LED or LEDs in these modules. In turn, the compact design of this lamp provides efficient cooling of the luminescent COB LEDs, and the heat received from them is concentrated and collected in the upper cooling subassembly of this lamp and dissipated outside as recovered heat energy, and in addition, the use of thermal conducting paste between the plates reflecting the heat of COB LEDs and the cooling plate also provides good heat removal from these LEDs. On the other hand, the use of a closed water circuit receiving heat from the luminescent COB LEDs with the use of the cooling subassembly consisting of an impeller cooling fan and a water radiator with a ribbed wall and water chambers resulted in a stable cooling efficiency of these LEDs and a recovery of heat accumulated in this radiator, which allowed for the use of maximum efficiency and power of these LEDs.

In addition, the used COB LEDs can light, depending on the needs, in various light colors (in the range of 3300-12000 Kelvin) and with different wavelengths of light in the range above 100 nm, UV light, and 350-840 nm in infrared, which enables the versatile use of these lamps, e.g. in construction, medicine, lighting of roads and sidewalks, as well as, by the possibility of selecting the optimal lighting for all conditions and each stage of development of cultivated plants, are used in greenhouses and tunnels.

BRIEF DESCRIPTION OF THE DRAWINGS

The subject of the invention is shown in an embodiment of its first variant in FIG. 1-FIG. 74 and in an embodiment of its second variant in FIG. 75-FIG. 80, in which.

DETAILED DESCRIPTION OF THE INVENTION

Figure 1:
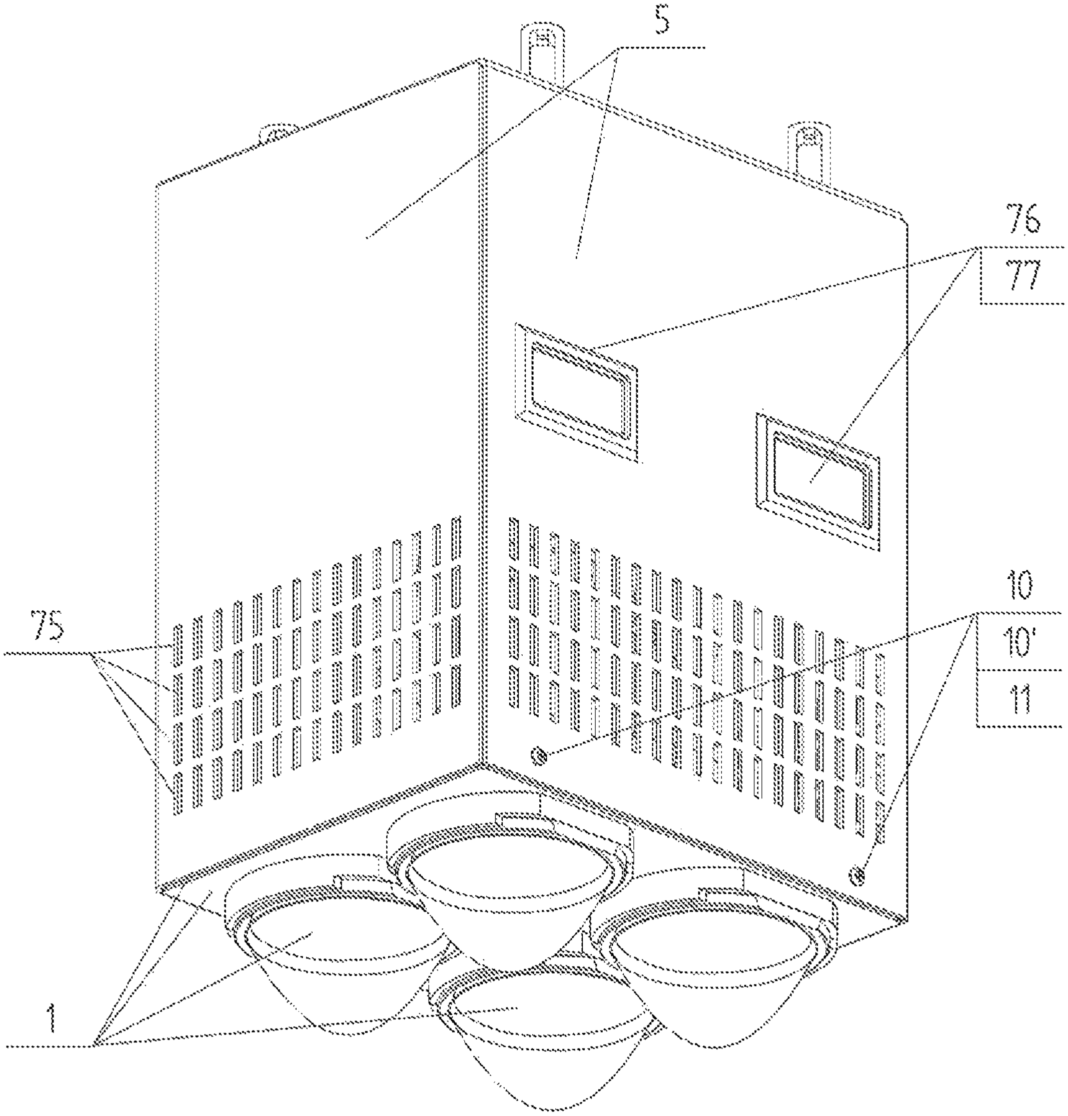
FIG. 1 shows a water-cooled lighting lamp in a perspective view.
Figure 3:
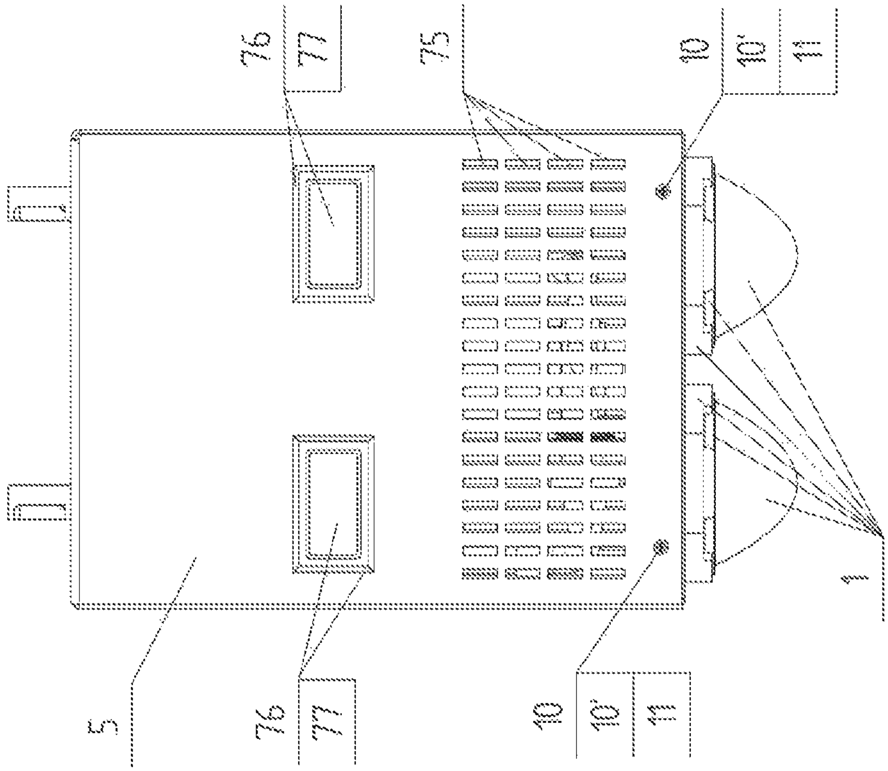
FIG. 3 shows the same lamp in a side view from the side equipped with two LED displays.
Figure 2:
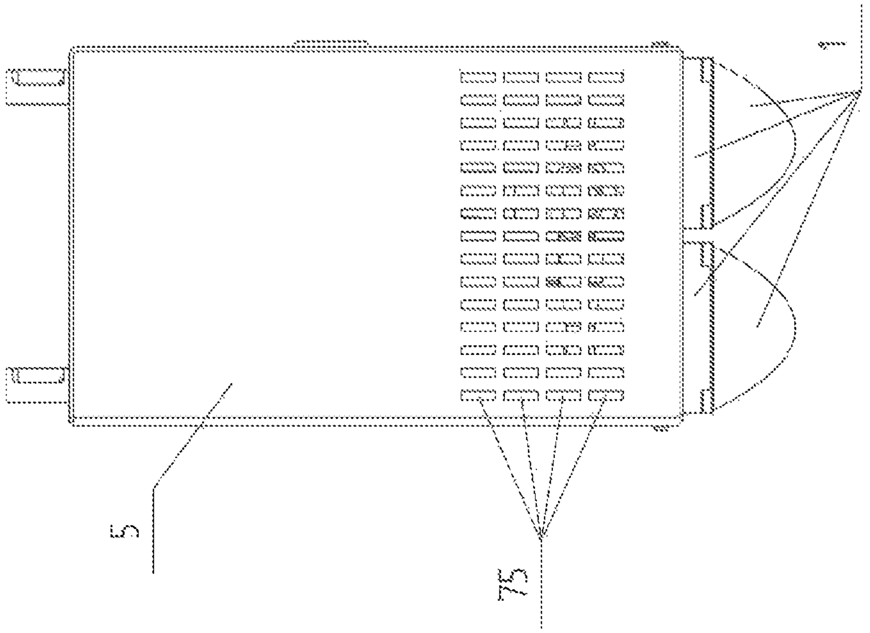
FIG. 2 shows the same lamp in a side view.
Figure 4:
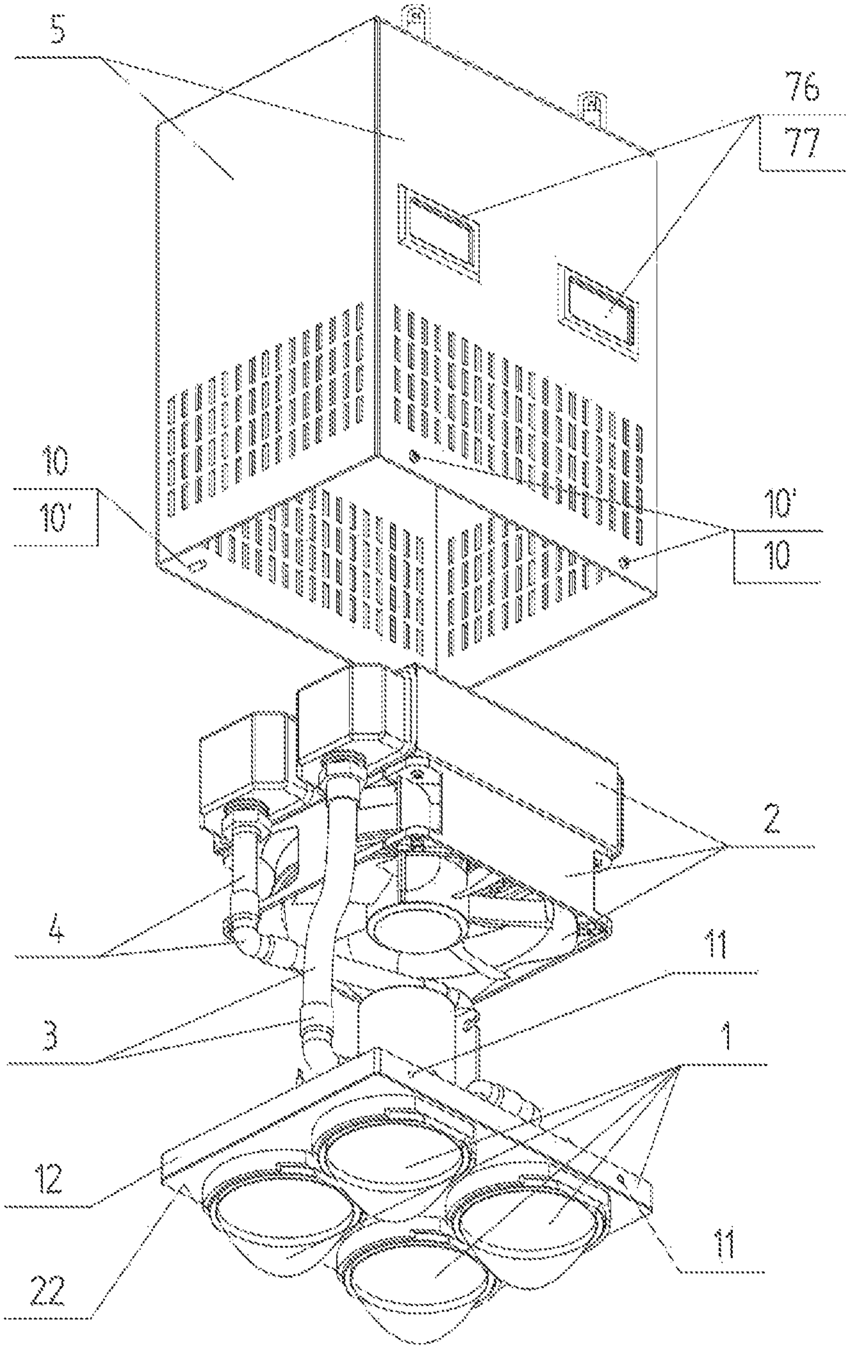
FIG. 4 shows the same lamp in the disassembled state of its housing and the load-bearing and lighting subassembly placed in it and the cooling subassembly connected to each other by pipe fittings in a perspective view from below.
Figure 5:
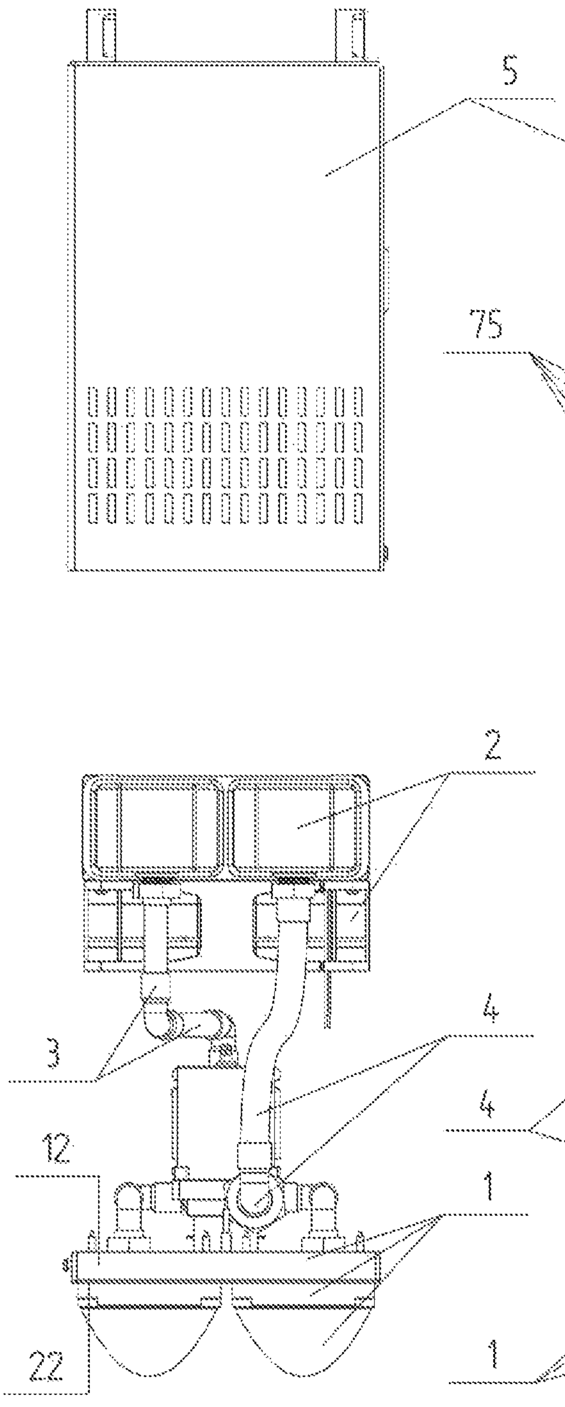
FIG. 5 shows the lamp shown in FIG. 4 in a perspective view from the narrow side of the lamp housing.
Figure 6:
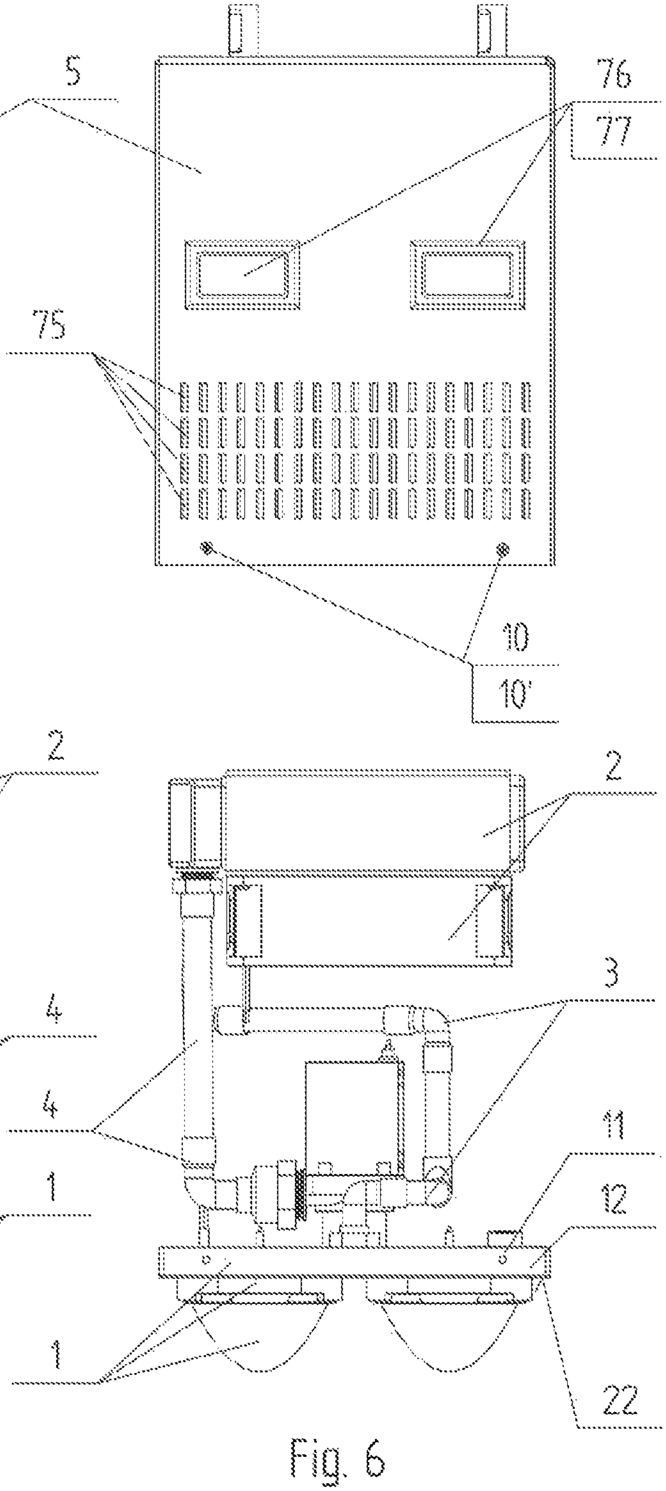
FIG. 6 shows the lamp shown in FIG. 4 in a perspective view, but from the wider side of the housing equipped with two LED displays.
Figure 7:
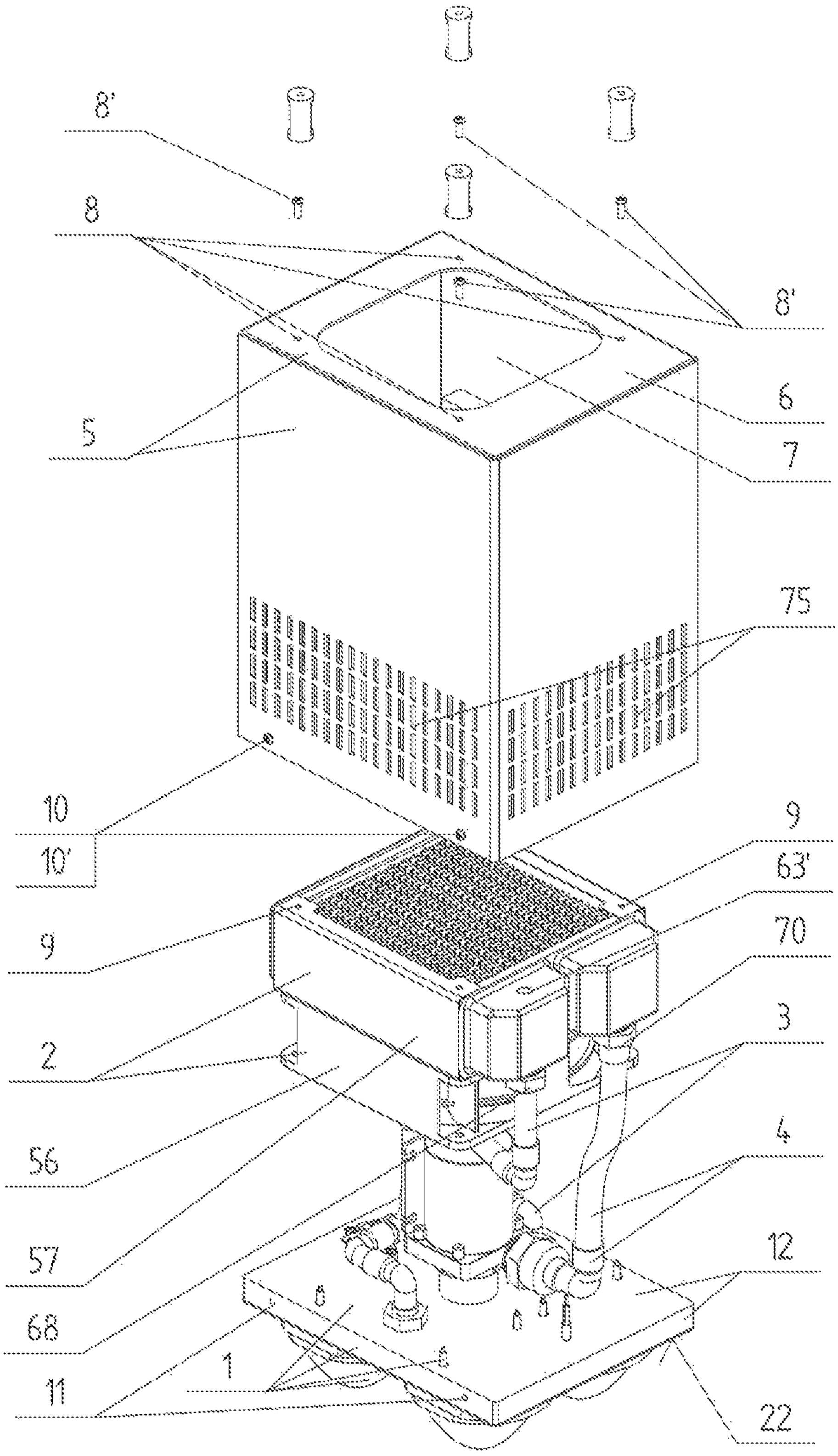
FIG. 7 shows the lamp shown in FIG. 4 in a perspective view from top.
Figure 8:
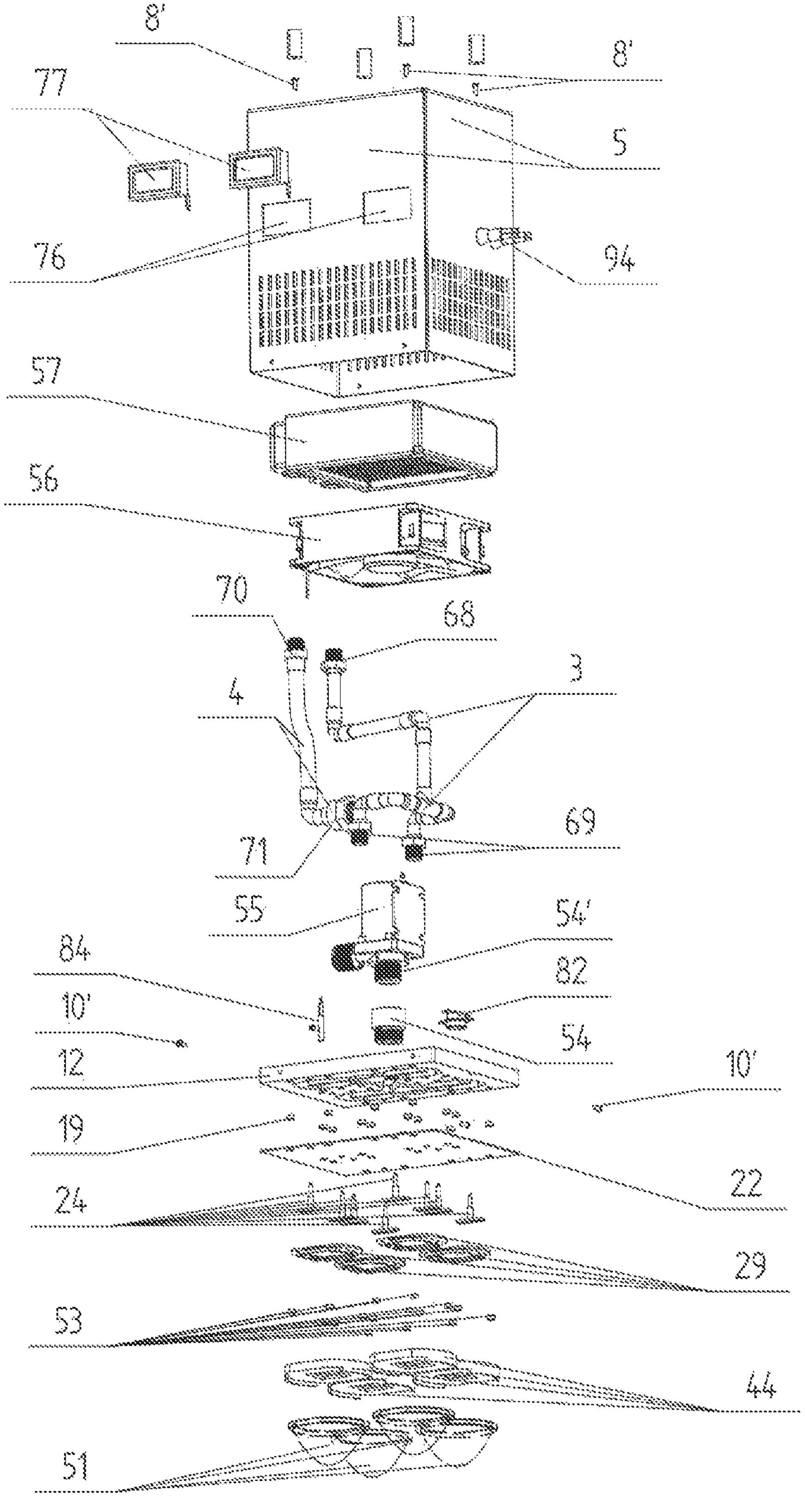
FIG. 8 shows the same lighting lamp in the exploded view of all its components in a perspective view, FIG. 8/1 shows two sets of pipe connectors connecting the load-bearing and lighting subassembly with the radiator of the cooling subassembly in perspective views.
Figure 9:
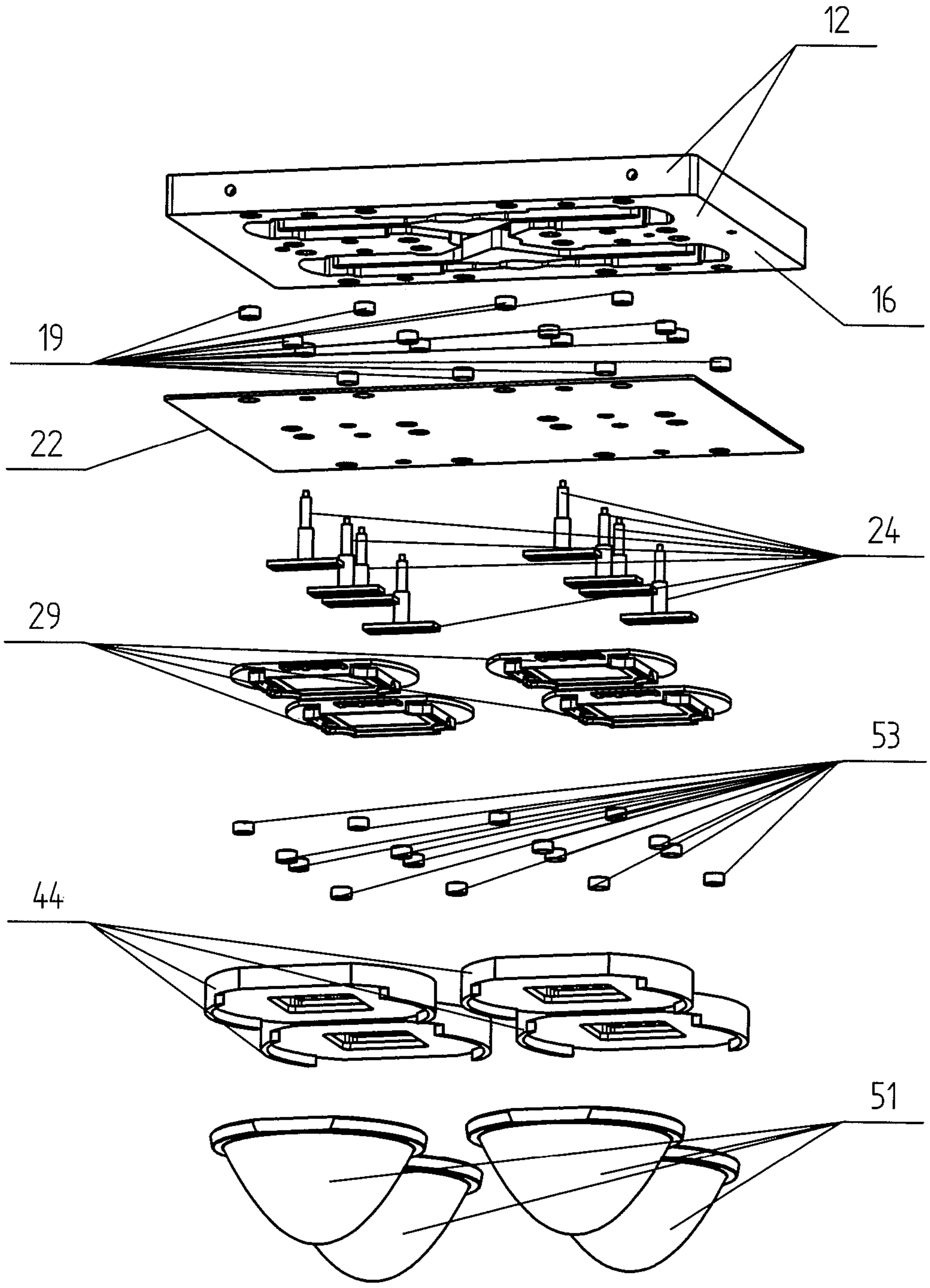
FIG. 9 shows a load-bearing and lighting subassembly of this lamp in the exploded state of its components in a perspective view.
Figure 10:
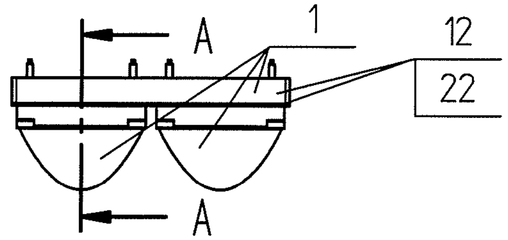
FIG. 10 shows a load-bearing and lighting subassembly in the front view from the shorter side of its heat receiving plate and a cover connected thereto.
Figure 11:
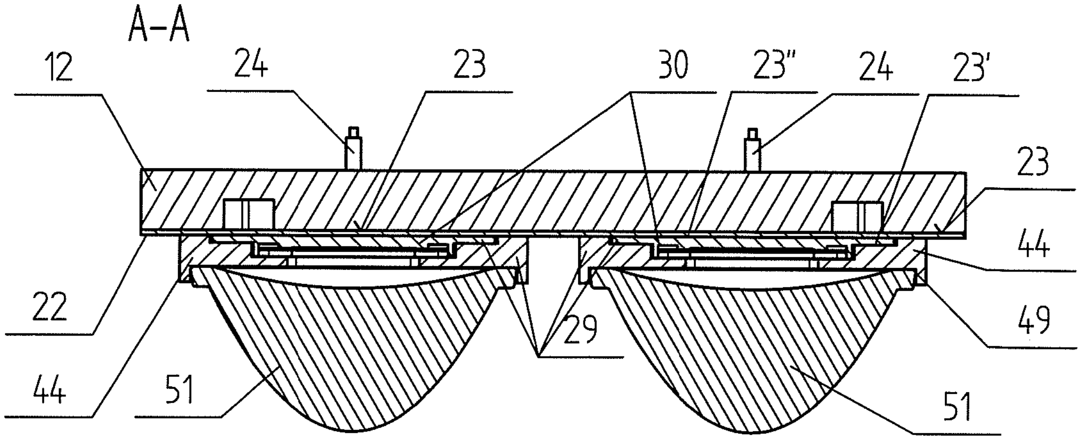
FIG. 11 shows the same subassembly in enlarged vertical section along line A-A.
Figure 12:
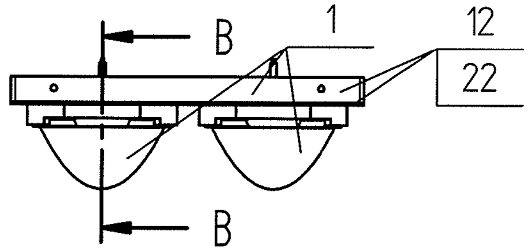
FIG. 12 shows the same subassembly in a side view from the longer side of its heat receiving plate and a cover connected thereto.
Figure 13:
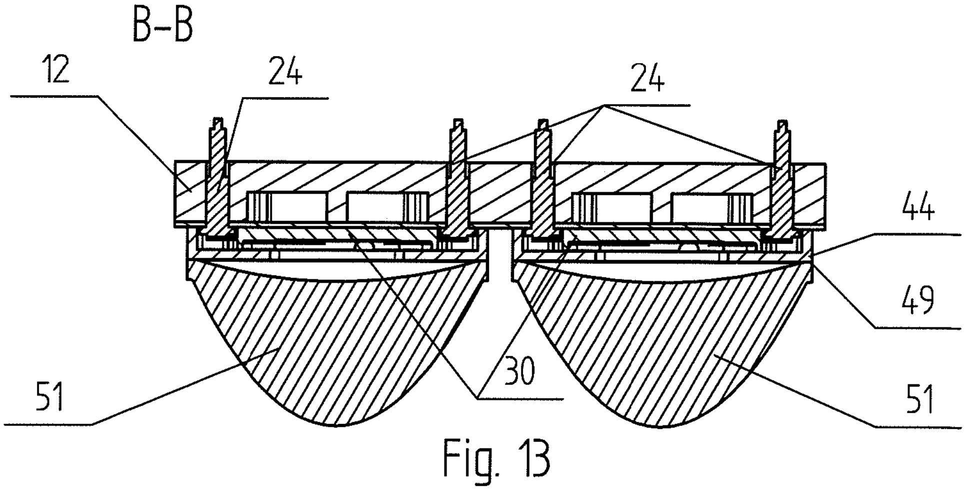
FIG. 13 shows the same subassembly in an enlarged vertical section along line B-B.
Figure 14:
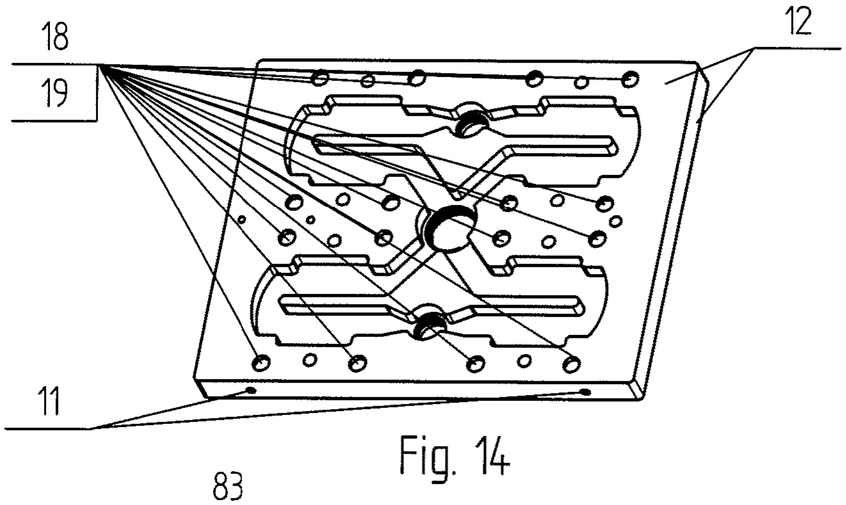
FIG. 14 shows a heat receiving plate of the load-bearing and lighting subassembly in a perspective view from above and its two side walls.
Figure 15:
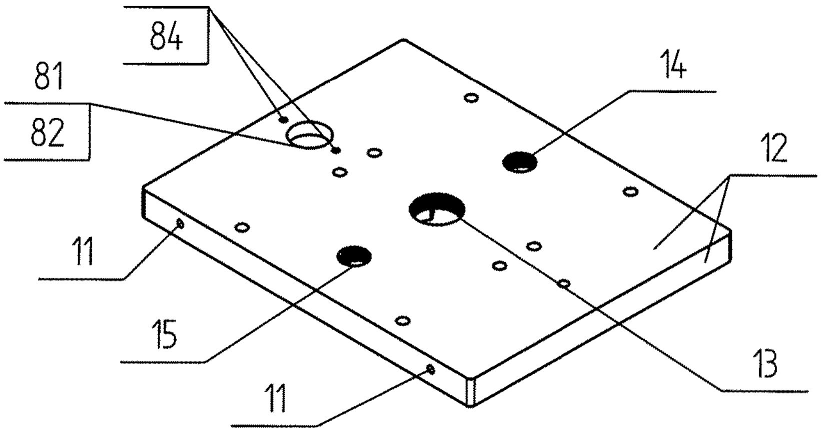
FIG. 15 shows a perspective view of the same heat receiving plate of the load-bearing and lighting subassembly from below and two side walls.
Figure 16:
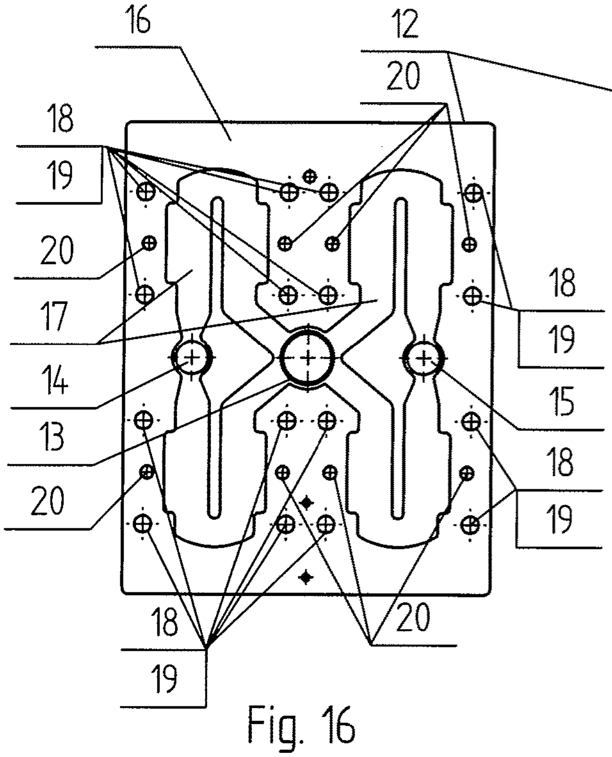
FIG. 16 shows a top view of the same heat receiving plate.
Figures 17, 18:
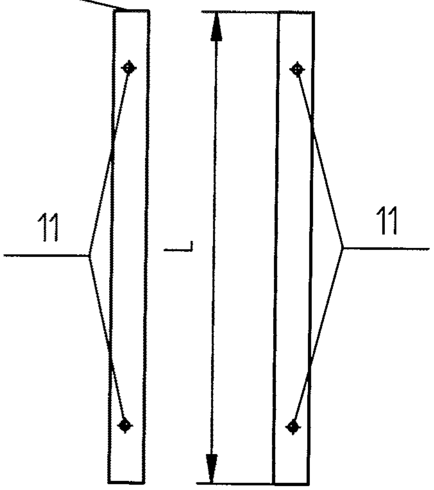
FIGS. 17 and 18 show the same heat receiving plate in the view of both its longer side walls with mounting openings made in them.
Figure 19:
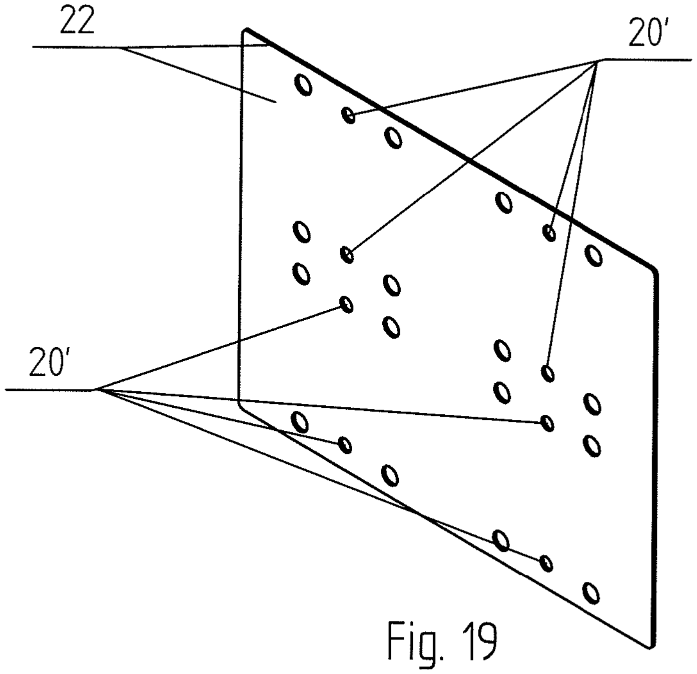
FIG. 19 shows the cover of the heat receiving plate in a perspective view.
Figure 20:
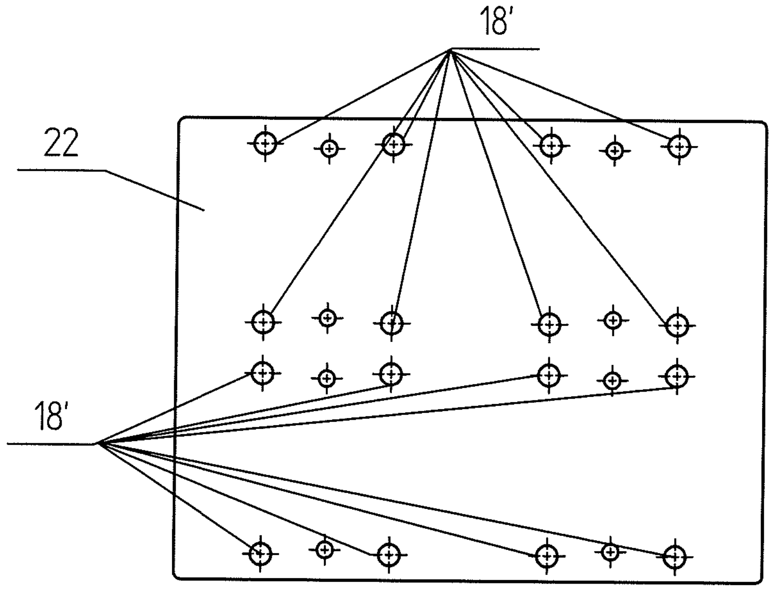
FIG. 20 shows the same cover in a top view.
Figure 21:
FIG. 21 shows the same cover in a front view.
Figure 22:
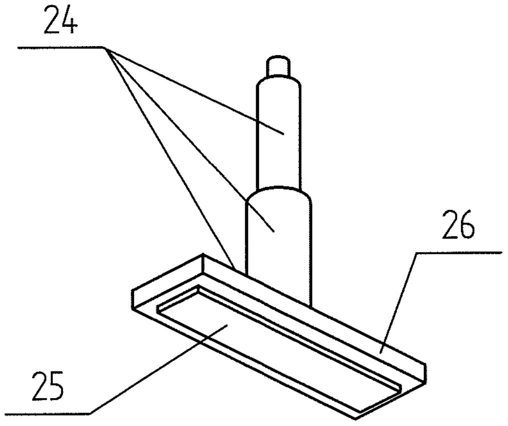
FIG. 22 shows a copper electrical contact connector in a perspective view from below.
Figure 23:
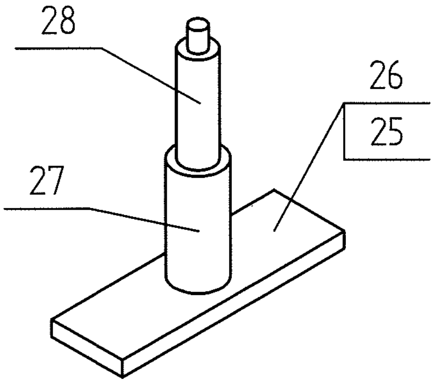
FIG. 23 shows the same contact connector in a perspective view from above.
Figure 24:
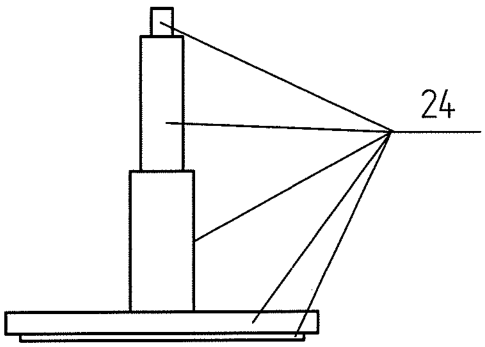
FIG. 24 shows the same connector in a perspective front view.
Figure 25:
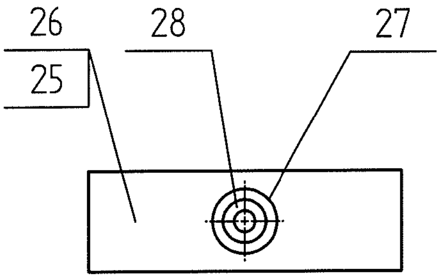
FIG. 25 shows the same connector in a top view.
Figure 26:
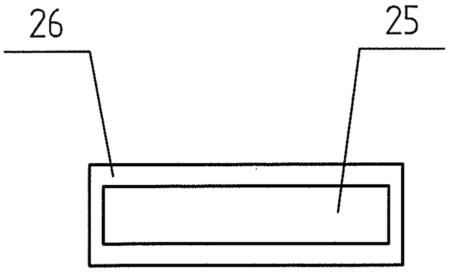
FIG. 26 shows the same connector in a bottom view.
Figure 27:
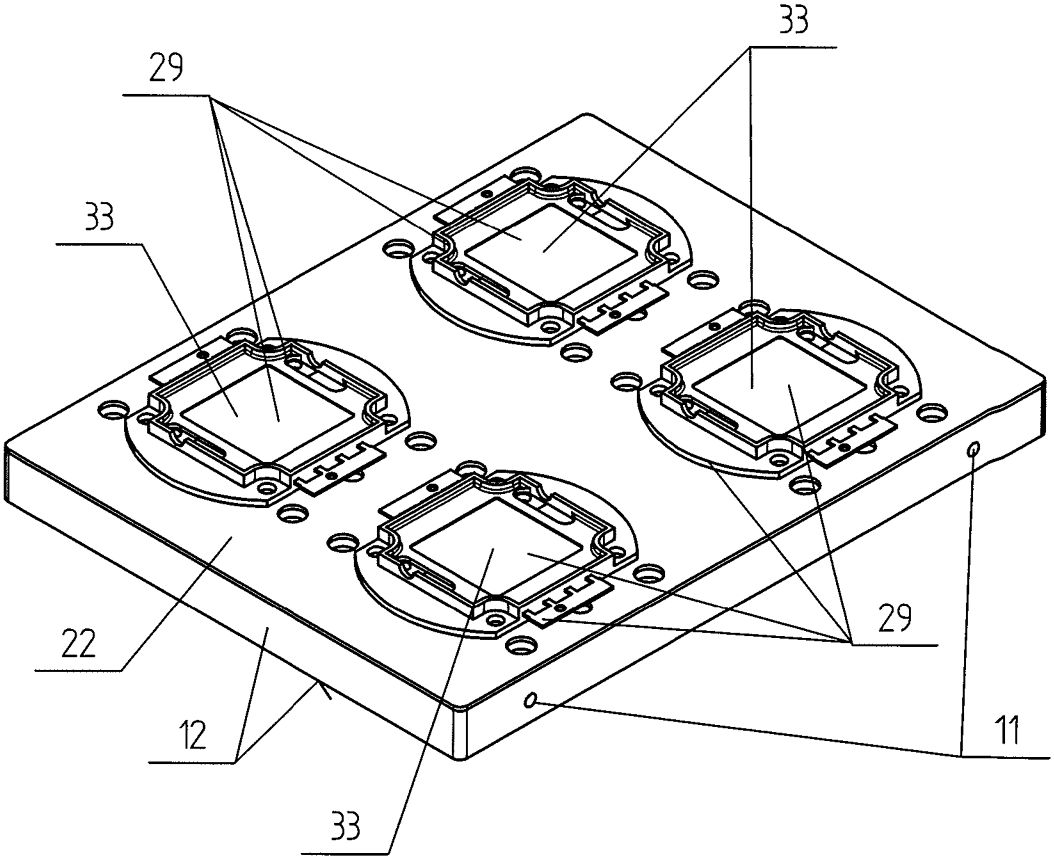
FIG. 27 shows a set of heat receiving plate and its cover equipped with four COB (Chip On Board) LED modules in a perspective view from above and two side walls of this plate and its cover.
Figure 28:
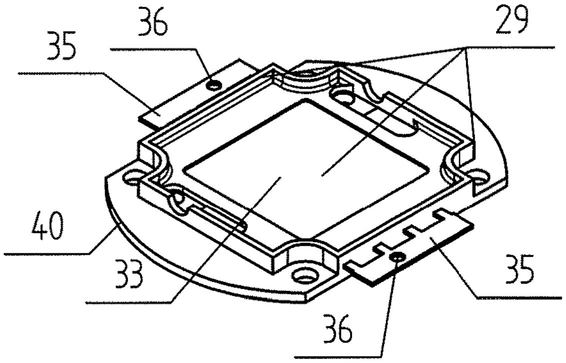
FIG. 28 shows the module with the COB LED in a perspective view.
Figure 29:
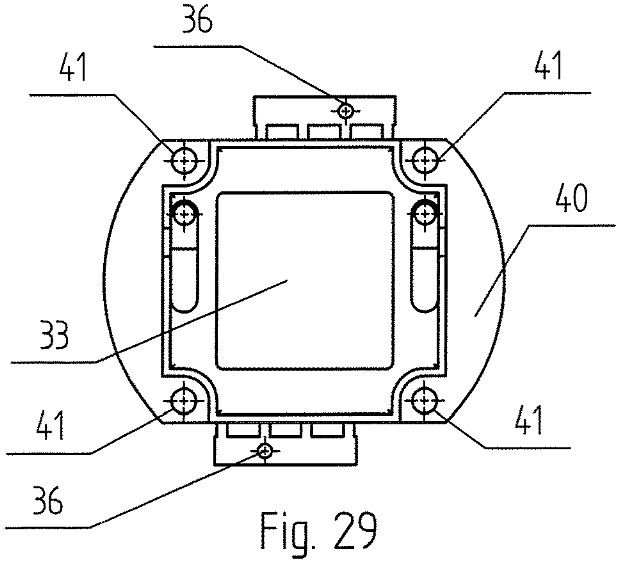
FIG. 29 shows the same module in the top view.
Figure 30:
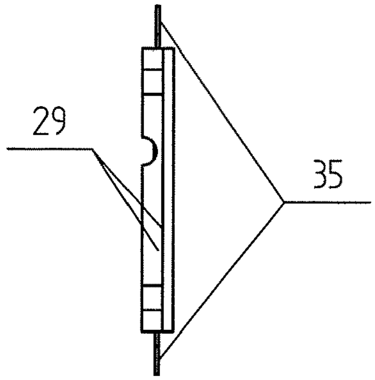
FIG. 30 shows the same module in the side view from the rounded side of its heat radiating plate.
Figure 31:
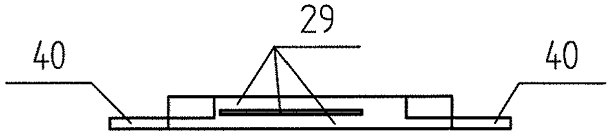
FIG. 31 shows a front view of the same module from the straight side wall of its heat radiating plate.
Figure 32:
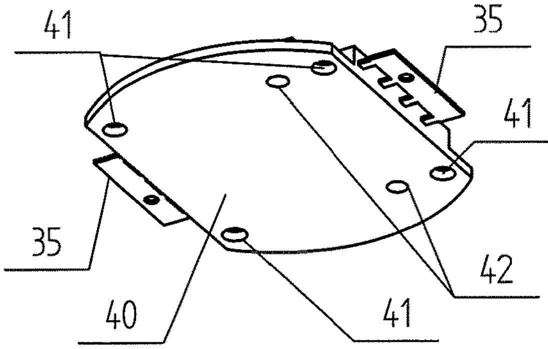
FIG. 32 shows a heat radiating plate of the COB LED module in a perspective view.
Figure 33:
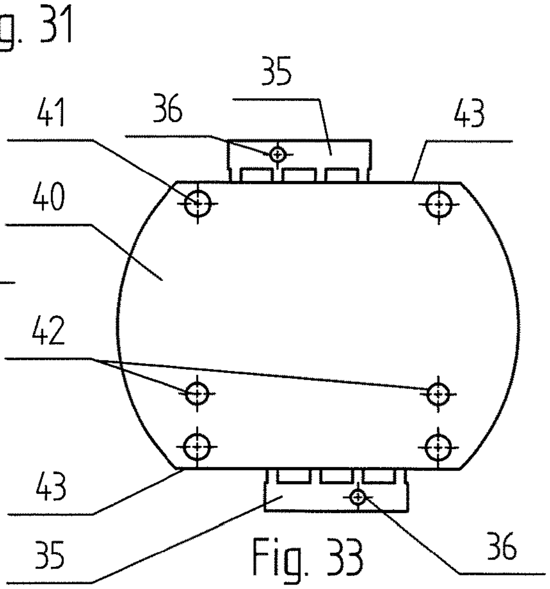
FIG. 33 shows a top view of the same heat radiating plate.
Figure 34:
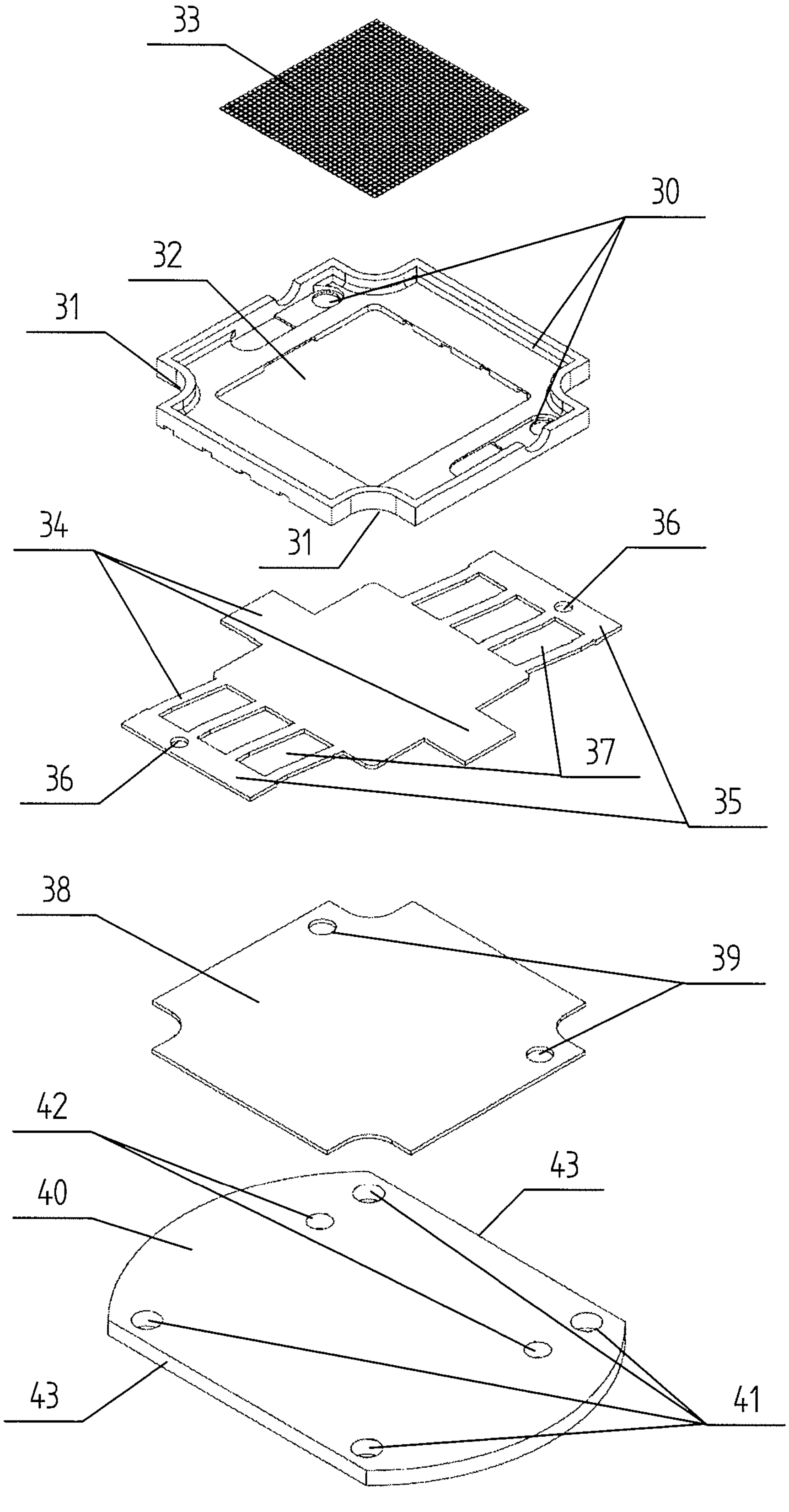
FIG. 34 shows a module with a COB LED as a light source in the exploded state of its components in a perspective view.
Figure 35:
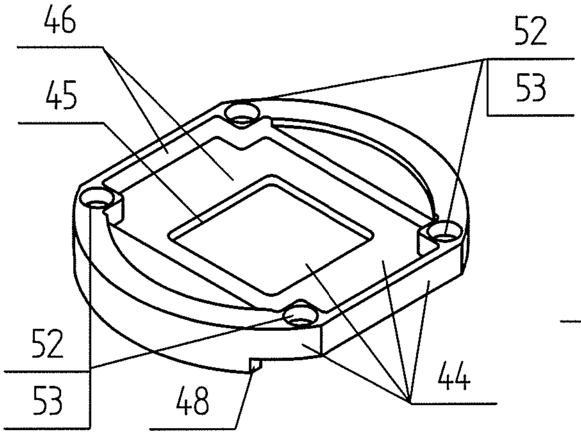
FIG. 35 shows a profile holder of the COB LED module in a perspective view.
Figure 36:
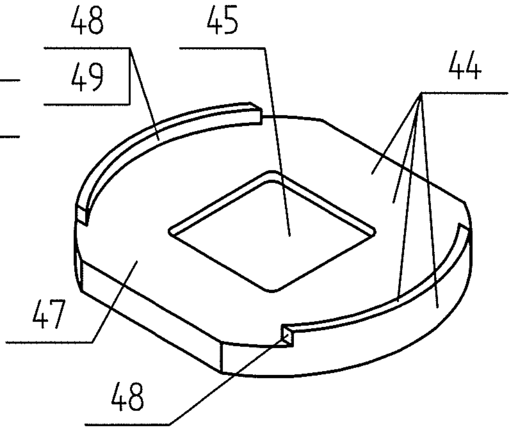
FIG. 36 shows the same profile holder in a perspective view from the side of embedding a diffusing lens in it.
Figure 37:
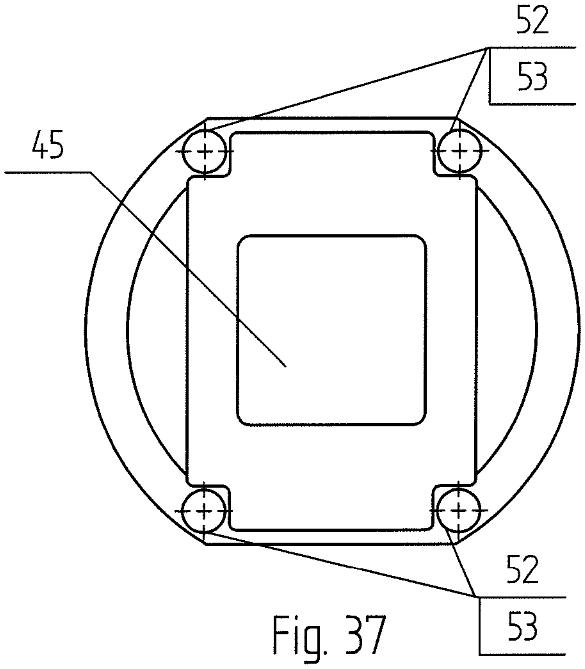
FIG. 37 shows the same profile holder in a top view from the side of mounting the COB LED module in it.
Figure 38:
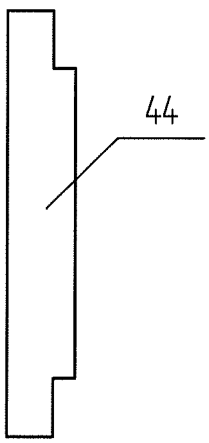
FIG. 38 shows the same profile holder in a view from its rounded side.
Figure 39:
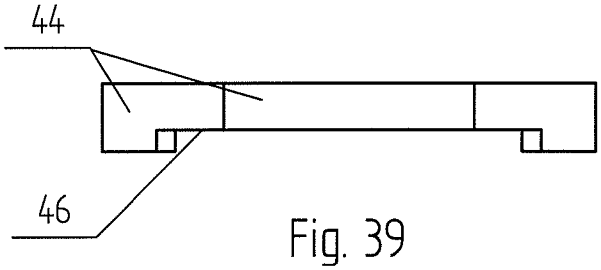
FIG. 39 shows the same profile holder in a side view with its straight wall.
Figure 40:
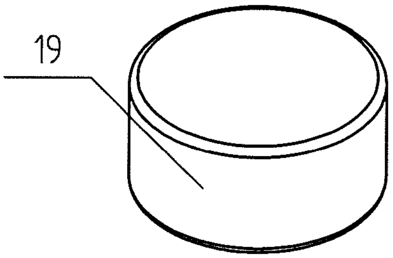
FIG. 40 shows a neodymium magnet in a perspective view.
Figure 41:
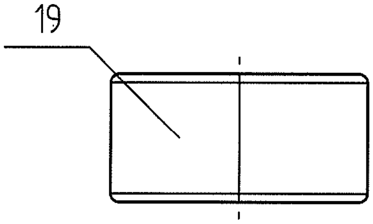
FIG. 41 shows the same magnet in a front view.
Figure 42:
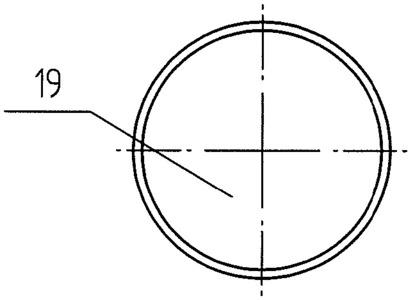
FIG. 42 shows the same magnet in a top view.
Figure 43:
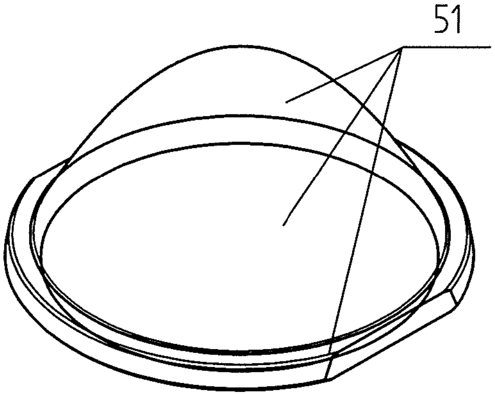
FIG. 43 shows a paraboloid lens scattering light rays produced by the COB LED as a light source with a lower annular offset in a perspective view.
Figure 44:
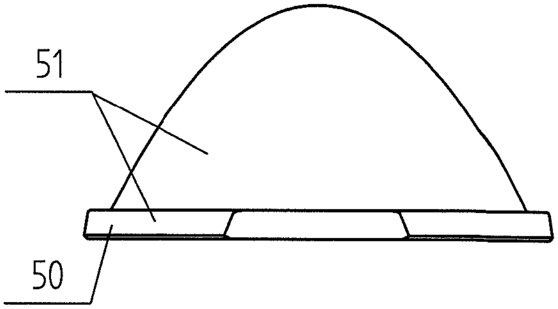
FIG. 44 shows the same paraboloid lens with the lower annular offset in a front view.
Figure 45:
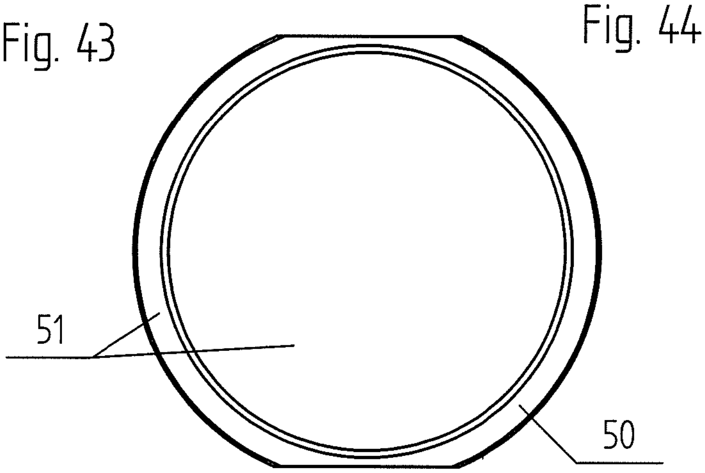
FIG. 45 shows the same paraboloid lens in a top view.
Figure 46:
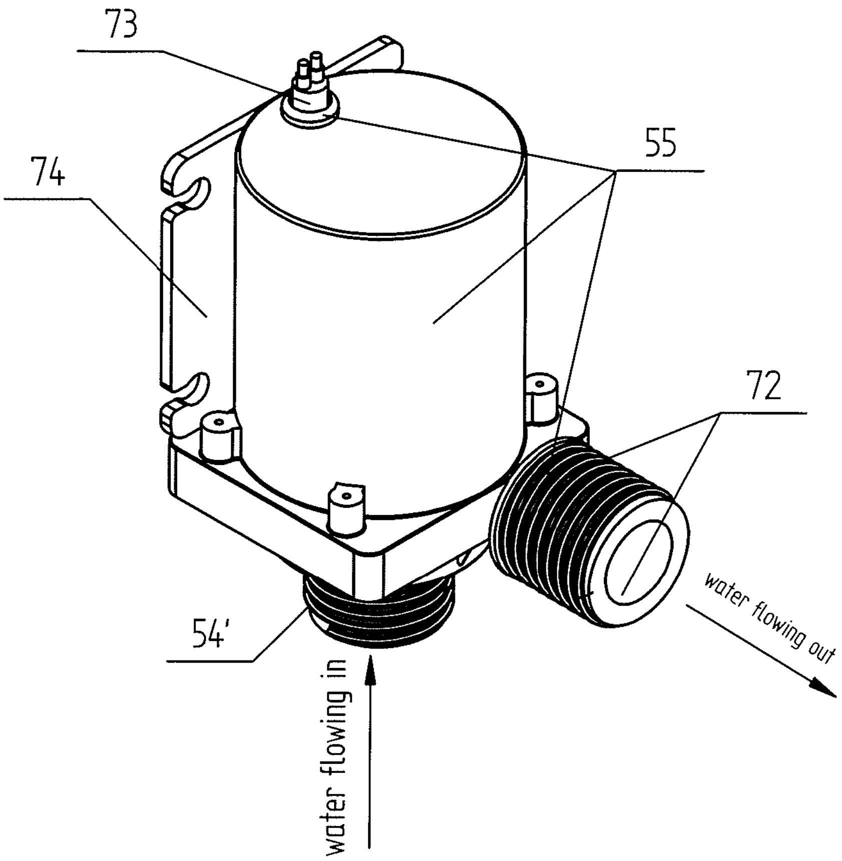
FIG. 46 shows a water pump of the load-bearing and lighting subassembly in a perspective view.
Figure 47:
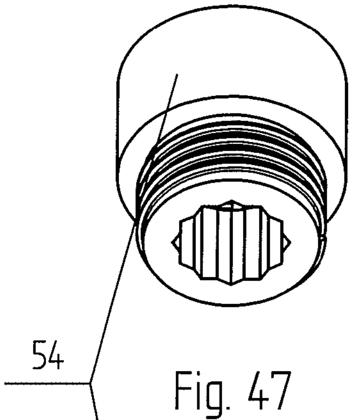
FIG. 47 shows a brass bushing threaded connector connecting the water pump to the heat receiving plate in a perspective view.
Figure 49:
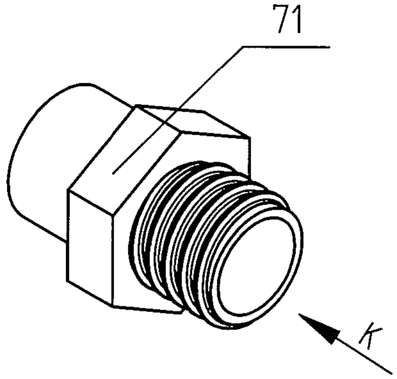
FIG. 49 shows one of the four brass connectors connecting, via brass connecting pipe sets, the heat receiving plate with the water radiator in a perspective view.
Figure 48:
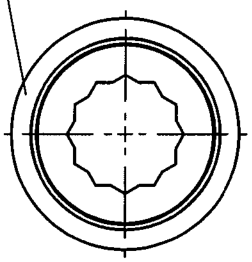
FIG. 48 shows the same bushing connector in a bottom view.
Figure 50:
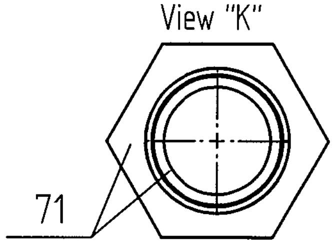
FIG. 50 shows the same connector in the direction of arrow "K"
Figure 51:
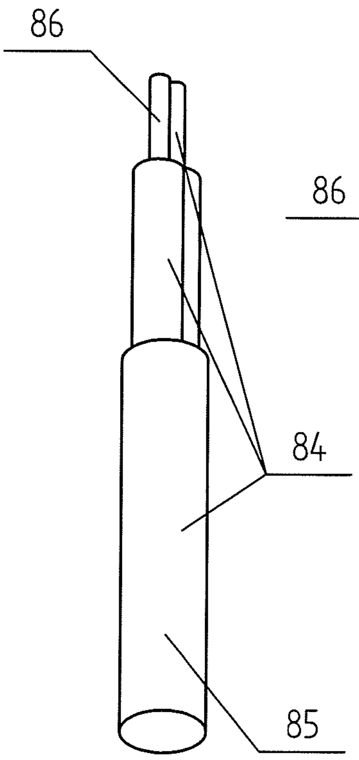
FIG. 51 shows a temperature sensor in a perspective view.
Figure 52:
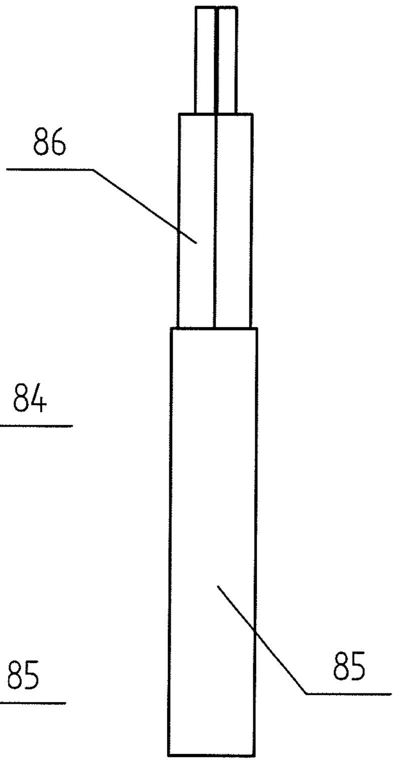
FIG. 52 shows the same sensor in a front view.
Figure 53:
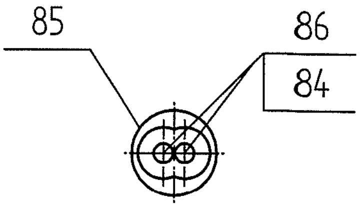
FIG. 53 shows the same sensor in a top view.
Figure 54:
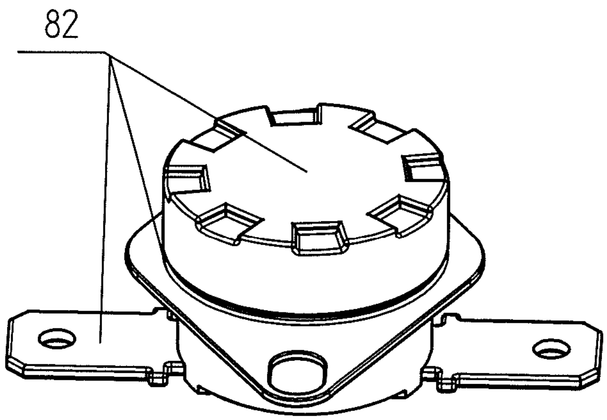
FIG. 54 shows a temperature fuse in a perspective view.
Figure 55:
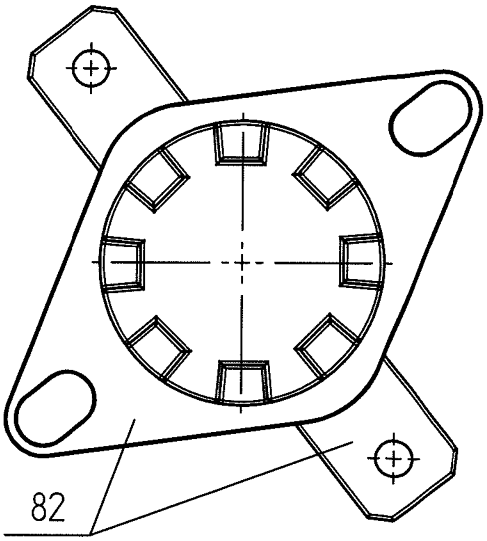
FIG. 55 shows the same fuse in a top view.
Figure 56:
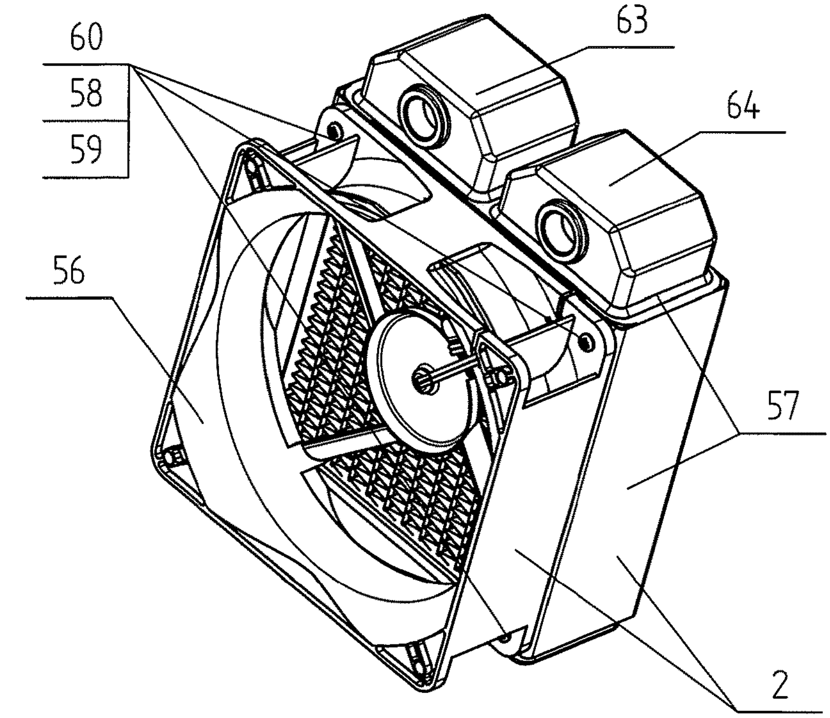
FIG. 56 shows a perspective view of the cooling subassembly.
Figure 57:
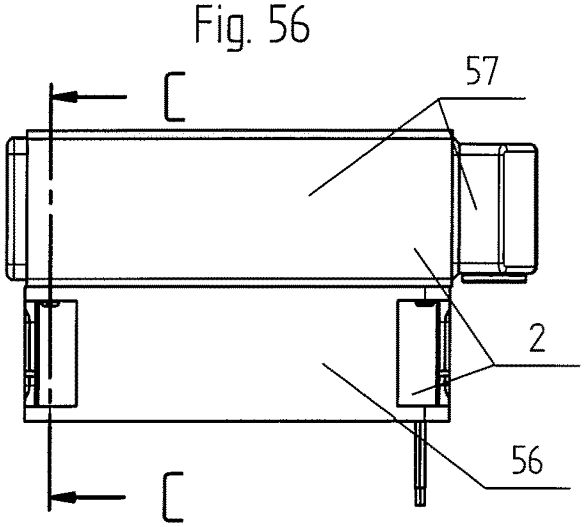
FIG. 57 shows the same subassembly in a front view.
Figure 58:
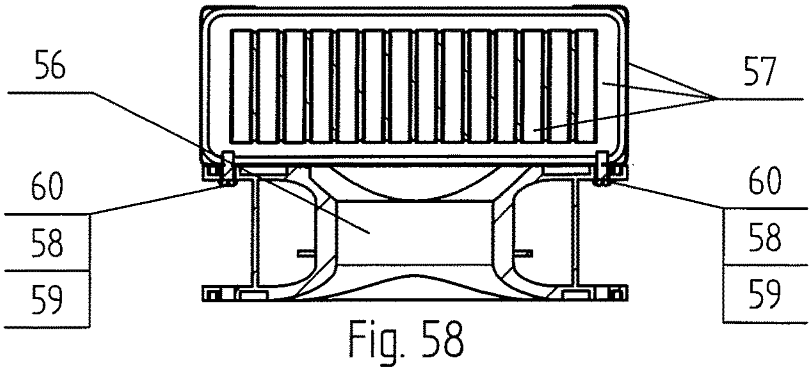
FIG. 58 shows the same subassembly in a vertical section along the line C-C.
Figure 59:
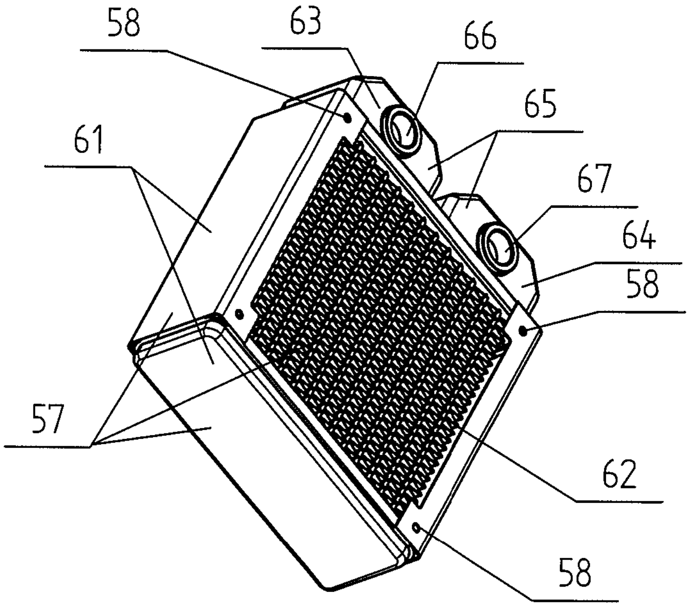
FIG. 59 shows a radiator of the cooling component in a perspective view.
Figure 60:
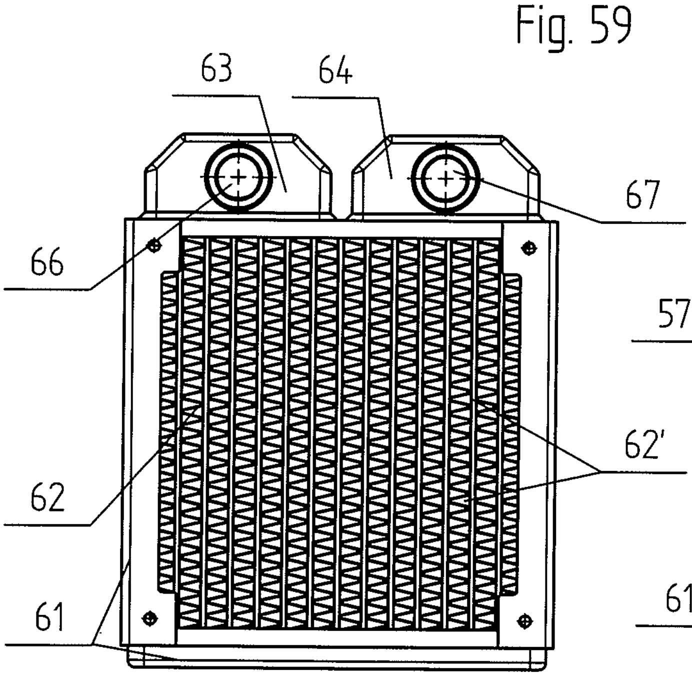
FIG. 60 shows the same radiator in a front view.
Figure 61:
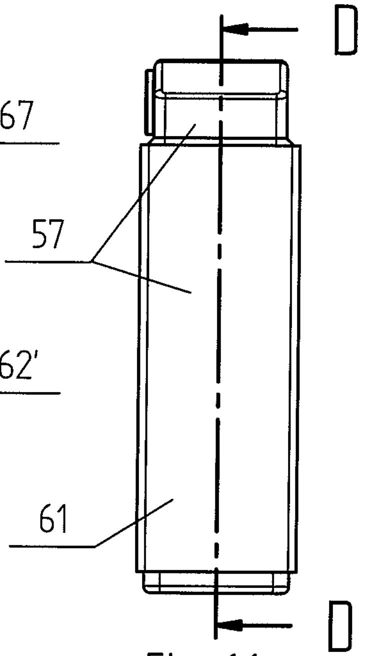
FIG. 61 shows the same radiator in a side view.
Figure 62:
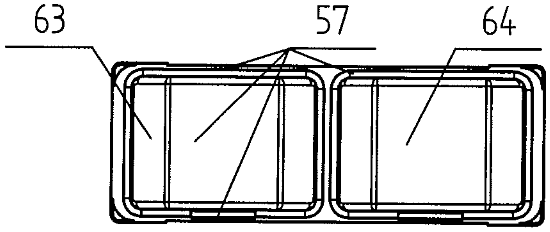
FIG. 62 shows the same radiator in a top view.
Figure 63:
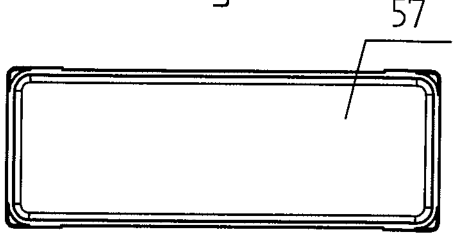
FIG. 63 shows the same radiator in a bottom view.
Figure 64:
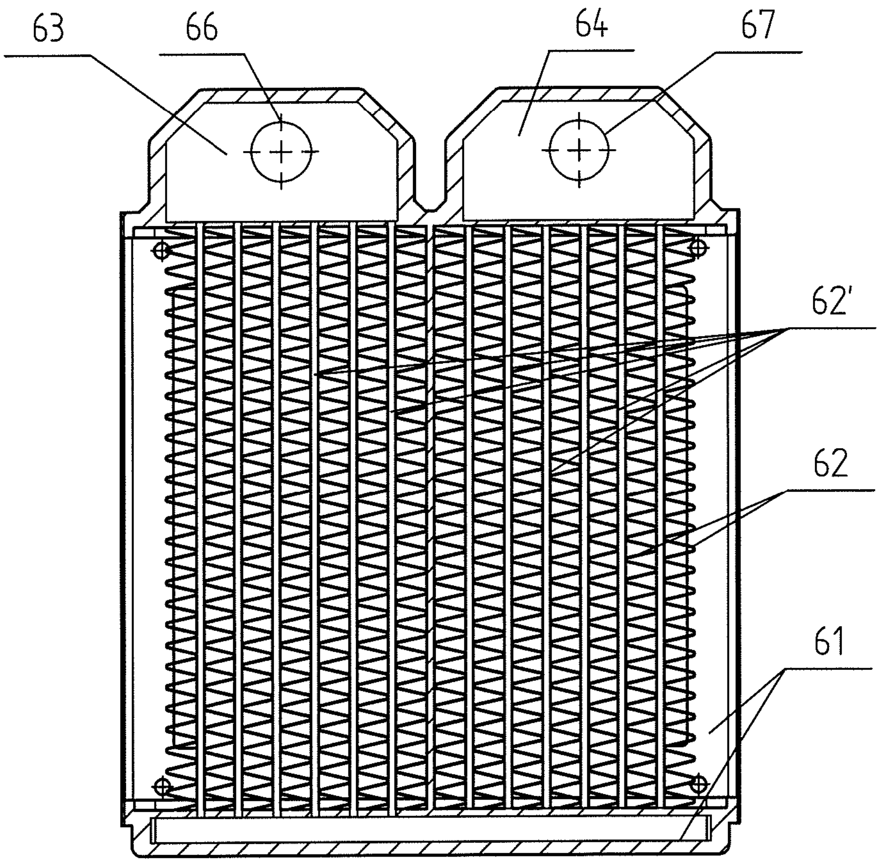
FIG. 64 shows the same radiator in a vertical section along line D-D.
Figure 65:
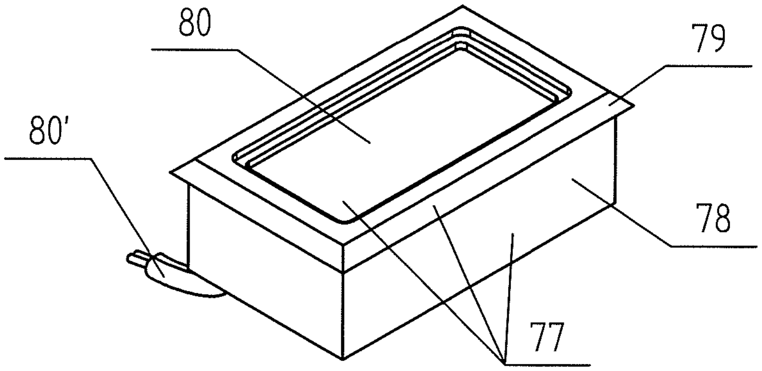
FIG. 65 shows a LCD display of the lamp housing in a perspective view.
Figure 66:
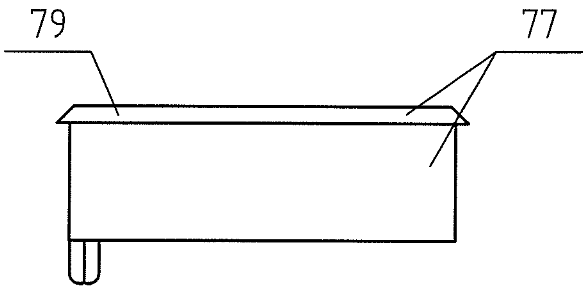
FIG. 66 shows the same display in a front view.
Figure 67:
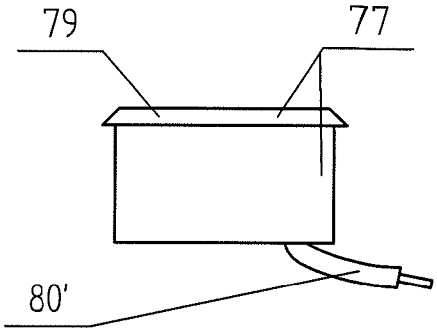
FIG. 67 shows the same display in a side view.
Figure 68:
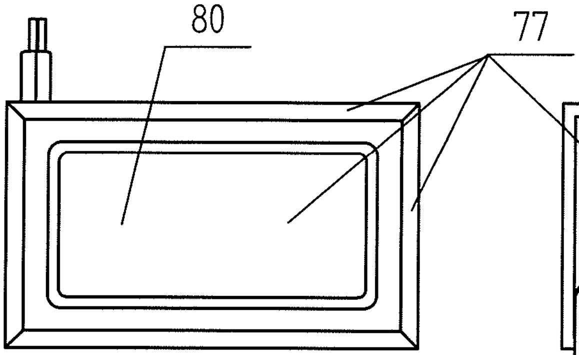
FIG. 68 shows the same display in a top view.
Figure 69:
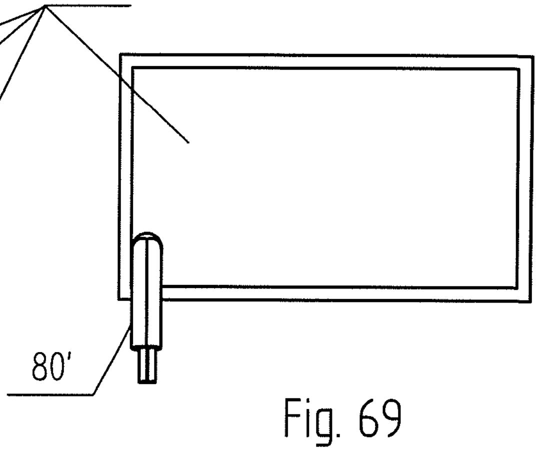
FIG. 69 shows the same display in a side view from the bottom.
Figure 70:
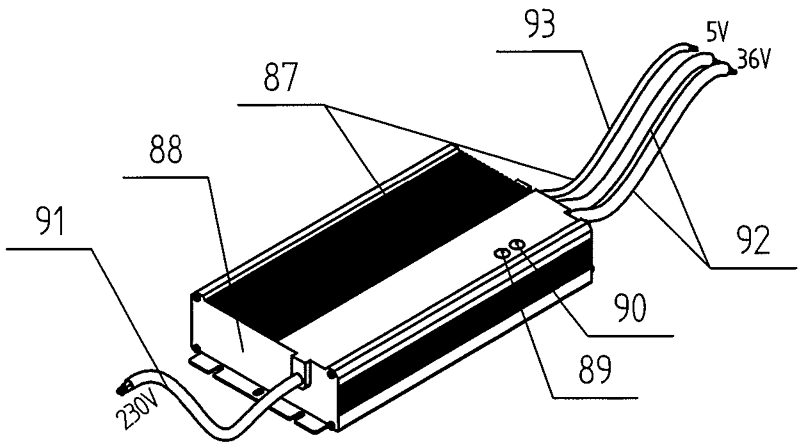
FIG. 70 shows a current power supply for elements of the lighting lamp in a perspective view.
Figure 71:
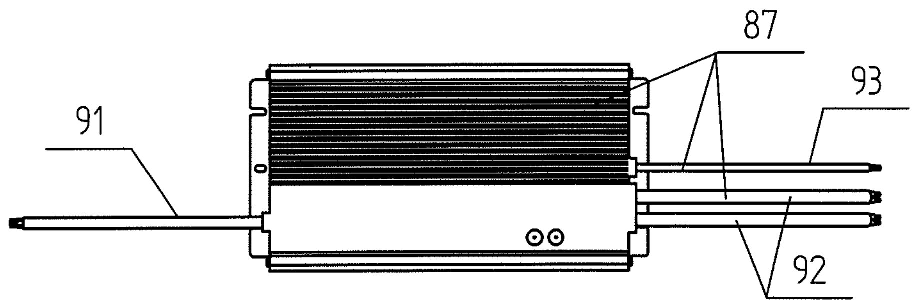
FIG. 71 shows the same power supply in a front view.
Figure 72:
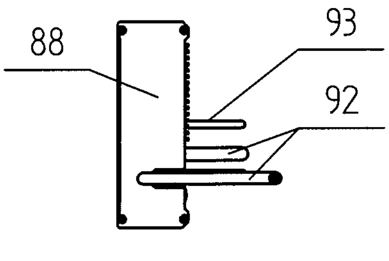
FIGS. 72 and 73 show the same power supply in a view from both side walls.
Figure 73:
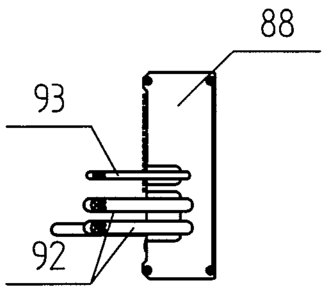
Figure 74:
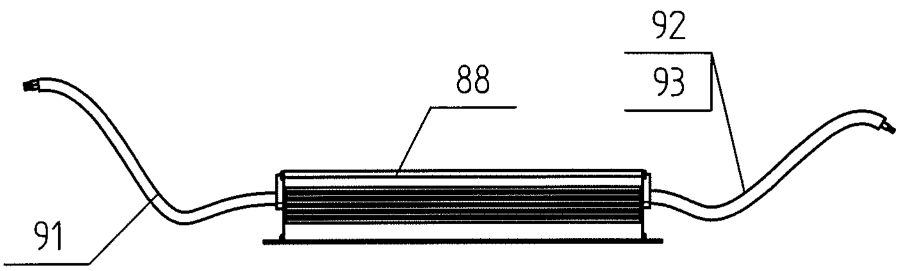
FIG. 74 shows the same power supply in a top view.

The water-cooled LED lighting lamp according to the invention includes a load-bearing and lighting subassembly 1 and a cooling subassembly 2 situated above it, both of these subassemblies are connected to each other by means of a first connecting copper pipes set 3 and a second connecting copper pipes set 4 and are placed in a rectangular bushing housing 5, whose the upper bottom 6 with a rectangular extraction 7 is connected by means of screws 8' to the cooling subassembly 2 through their mounting openings 8 and 9, and the lower ends of two opposite walls of this housing are connected by means of screws 10' to the load-bearing and lighting subassembly 1 through their mounting openings 10 and 11, this subassembly is equipped with:

a supporting, rectangular, aluminium cooling (heat receiving) plate 12 with three crosswise threaded mounting openings 13, 14 and 15 made in the middle of its length "L", and with profile identical channels 17 connected with each other made on its inner surface 16 with cooling water flowing through them, and between them and along its two long sides it has four blind openings 18 with sixteen cylindrical neodymium magnets 19 embedded in them, protruding above the surface 16 of this plate, while between these magnets the plate has eight through mounting openings 20, and on both longer side walls it has two threaded mounting openings 11, a rectangular aluminium cover 22 of this cooling plate 12, in which through openings 18' and 20' are formed opposite the openings 18 and 20 of the cooling plate 12, so that neodymium magnets 19 are also embedded in the openings 18' of this cover which is inseparably connected to the surface 16 of this board 12 by means of the adhesive layer 23, eight electrical contact connectors 24 inserted through the openings 20' of the cover 22 in the openings 20 of the cooling plate 12, each of these electrical connectors has a rectangular copper contact plate 25 embedded on the surface of a plastic plate 26 connected to a plastic insulating bushing 27 with a cable 28 embedded therein, supplying electric current to this contact plate, four typical COB LED (Chip On Board) modules 29, each consisting of a profile housing 30 with rounded corner extractions 31 and a square extraction 32 on its surface, in which a square COB LED diode 33 with a power of 100 W and a voltage of 36 V is embedded, this housing is placed on a profile board 34 supplying this LED with electric current through a contact electrical connector 24, both ends of which with mounting openings 36 made in them and three rectangular extractions 37 protrude outside the housing, and the board is placed on another plate 38 with two corner openings 39 having an analogous shape to that of the housing 30, in turn this plate is placed on a profile plate 40 radiating heat, covered with a layer of thermally conductive paste 23" on top, with a circular sector profile with four mounting openings 41 made in its corners and two further mounting openings 42 located opposite openings 39 of plate 38, all of these elements are joined to each other by gluing, and the ends 35 of the plate 34 protruding from the outside of the housing 30 are perpendicular to the truncated straight sides 43 of the profile plate 40, both ends 35 of the plate 34 abutting two copper contact plates 25 of electrical connections 24;

four fixing holders 44 with a profile adapted to the profiles of the plates 40 radiating heat of the COB LED modules 29, in which the plates 40 are mounted with the help of glue 23'. Each of these identical four holders, in the axis of its symmetry, has a square through opening 45 arranged opposite the COB LED diode 33, and on one of its surface has a profile extraction 46 in which the profile housing 30 of the COB LED module 29 is embedded, and opposite its flat surface 47 on the round side has two arched offsets 48 situated opposite each other, between which a collar offset 50 of the lens 51 with a paraboloidal profile diffusing light rays from the COB LED diode 33 at an angle of 120° is also mounted and attached to this surface by means of glue 49, and furthermore each of these holders in its four corners has openings 52 with neodymium magnets 53 embedded in them, which contact (are connected) with neodymium magnets 19 embedded in the cooling plate 12 and its cover 22 of this load-bearing and lighting subassembly, the outer surface of the aluminium cover 22 is covered with a layer of thermal paste 23" (e.g. silicone paste).

In addition, a spacer connector 54 is screwed into the threaded opening 13 of the cooling plate 12, into which the lower threaded connection pipe 54' of the water pump 55 located in the symmetry axis of this plate is screwed.

In turn, the cooling subassembly 2 consists of a typical cooling fan 56 provided with a bladed rotor driven by an electric motor (not shown) powered by a voltage of 12V and a water radiator 57 placed thereon, the bodies of which at their corners through their mounting openings 58 and 59 are connected to each other by bolts 60, the radiator has a rectangular casing 61 with a ribbed bottom wall 62 and two side water chambers 63 and 64, the water chamber 63 on its upper surface has a sealed inlet 63' of the cooling agent, water in particular, and the side walls 65 of these water chambers are provided with threaded openings respectively for water supply 66 and for water drainage 67, while, inside the housing, parallel cooling channels 62' are mounted along the chamber length. Water is poured through the inlet opening 63', water, through the first pipe set 3 is supplied to the openings 14 and 15 of the cooling plate 12, filling the channels 17 arranged on its inner surface 16.

The load-bearing and lighting subassembly 1 is connected by means of a first connecting pipe set 3 and a second connecting pipe set 4 with the cooling subassembly 2, the brass upper connector 68 of the first pipe set 3 is screwed into a threaded opening 66 of the water chamber 63 of the radiator 57, and both its connectors 69 are screwed into threaded openings 14 and 15 of the rectangular plate 12 of the load-bearing and lighting subassembly 1, while the brass upper connector 70 of the second pipe set 4 is screwed into the threaded opening 67 of the water chamber 64 of the water radiator 57, and the lower connector 71 of this second pipe set is screwed into the threaded connection pipe 72 of the water pump 55 to form a closed circuit of the water flowing out of this pump, provided with power cables 73 and the mounting holder 74.

A rectangular bushing housing 5, at the lower ends of their side walls, has four rows of symmetrically positioned rectangular through openings 75, which serve to suck in cool air, and on one of its four walls above these openings there are two rectangular openings 76 with embedded in LCD displays 77, whose rectangular, hollow inside the housings 78 with external flange offsets 79, are equipped with LCD panels 80 embedded in them, and in the lower part they are equipped with power cables 80', while the upper surface of the cooling plate 12 of the load-bearing and lighting subassembly 1 has round socket 81, in which the temperature fuse 82 is mounted, and openings 83 on both sides thereof, with temperature sensors 84 of this plate embedded in them, having thermally sensitive bushing covers 85 with power cables 86 placed therein.

All the elements of this lighting lamp requiring their electric current supply are connected to an external power supply 87 with an electronic unit not shown in the drawing, whose rectangular housing 88 is equipped with a knob 89 controlling the voltage of the electric current and a knob 90 controlling the intensity of this current, and from one of its fronts the network cable 91 (230V) protrudes outside, and from its other end two output network cables 92 (36V) and one 5V output cable 93 protrude, with the power supply connected to the power cables 94 of the bushing housing 5. These cables, through a suitably programmed electronic system, not shown in the drawing, supply the water pump 55, LCD displays 77, temperature sensors 84, temperature fuses 82 and, through the electrical contact connector 24, COB LED diodes 33 with the appropriate electric current, and this system ensures automatic control of both the operation of this pump, as well as other elements requiring adjustment of their parameters to the temperature of the water cooling these LEDs. The supply of electricity to each profile plate 34 through its magnetic connection with the copper plate 25 of the electrical connector 24 causes lighting of the square COB LED diode 33, which can shine in different light colors with different wavelengths in the range above 100 nm of UV light and 350-840 nm of infrared light.

The cooling of the COB LED lamp consists in the fact that through the openings 75 made in the housing 5 of this lamp, cool air is sucked from the outside and inside this housing it receives heat from all heating elements of this lamp, after which the already slightly heated air is blown by the fan 56 to the water radiator 57, which also receives the heat generated by the COB LED diodes 33, and then passes through the ribbed bottom wall 62 of this radiator and through the rectangular opening 7 of the housing 5 to the outside.

Figure 75:
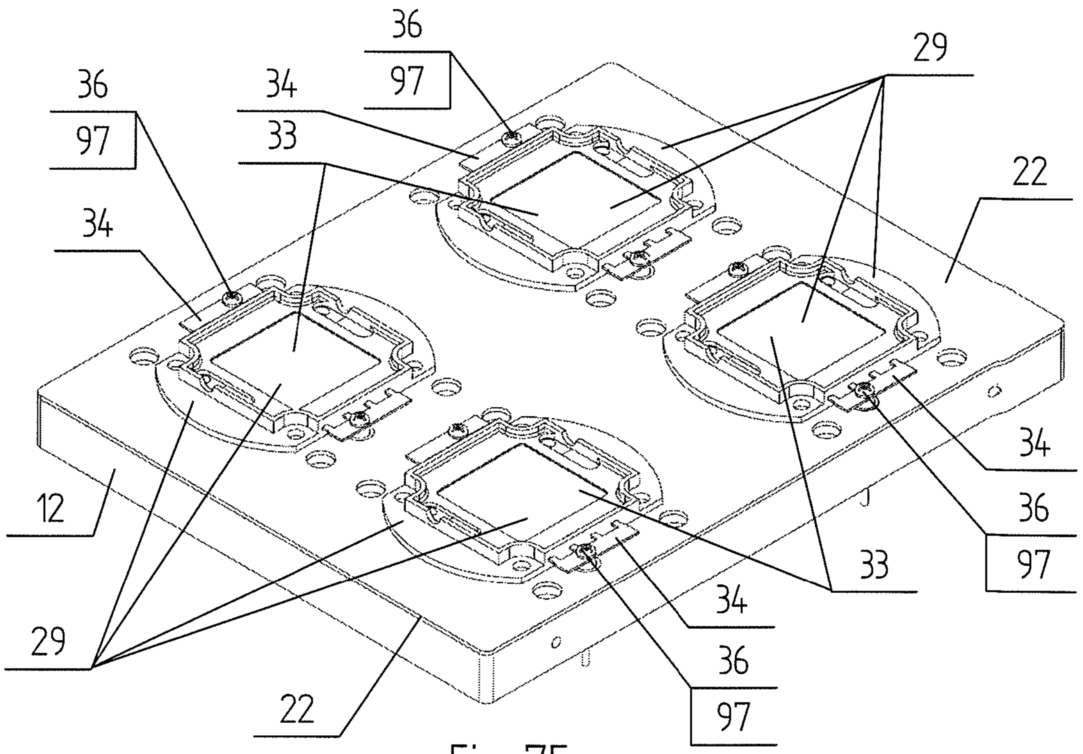
FIG. 75 shows a second variant of the set of the heat receiving plate and its cover equipped with four COB LED modules in a perspective view from above, and two side walls of this plate and the cover equipped with pin connection elements constituting a variant of the set shown in FIG. 27.
Figure 76:
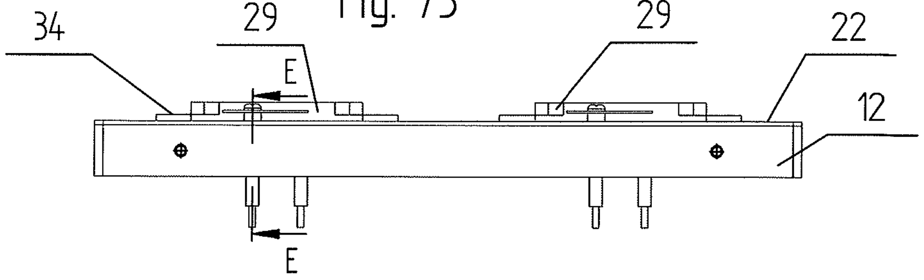
FIG. 76 shows the same second variant of the set in a front view.
Figure 77:
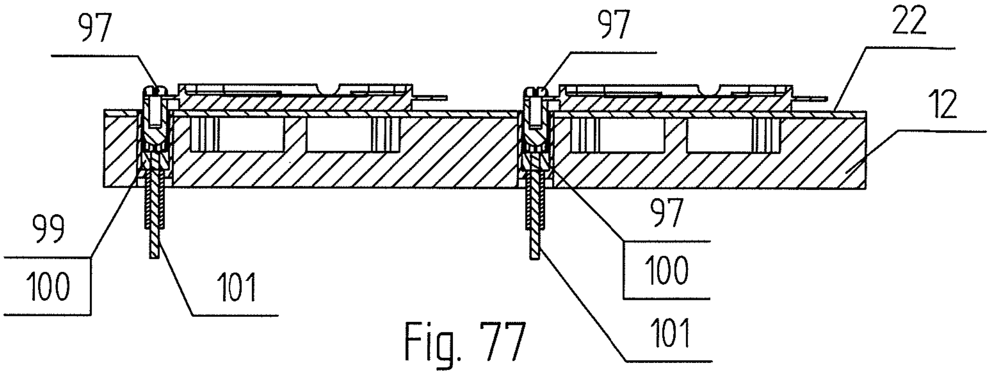
FIG. 77 shows the same variant of the set in a vertical section along line E-E.
Figure 78:
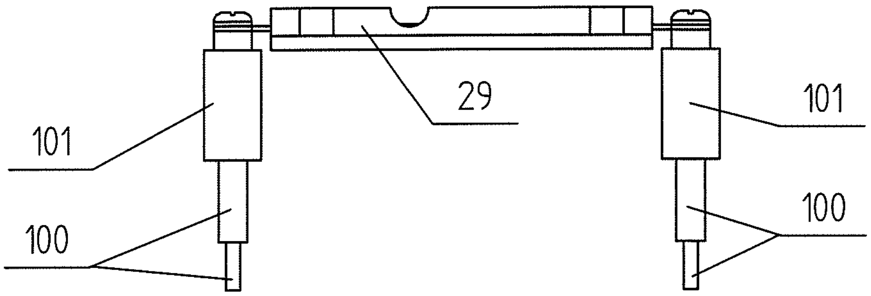
FIG. 78 shows the same second variant of the set in a front view.
Figure 79:
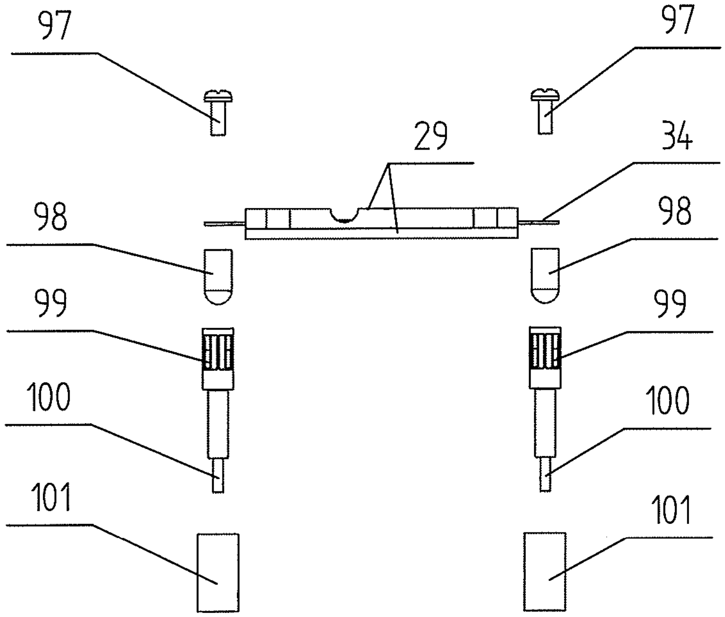
FIG. 79 shows the same second variant of the set in a exploded state of its components in a perspective view.
Figure 80:
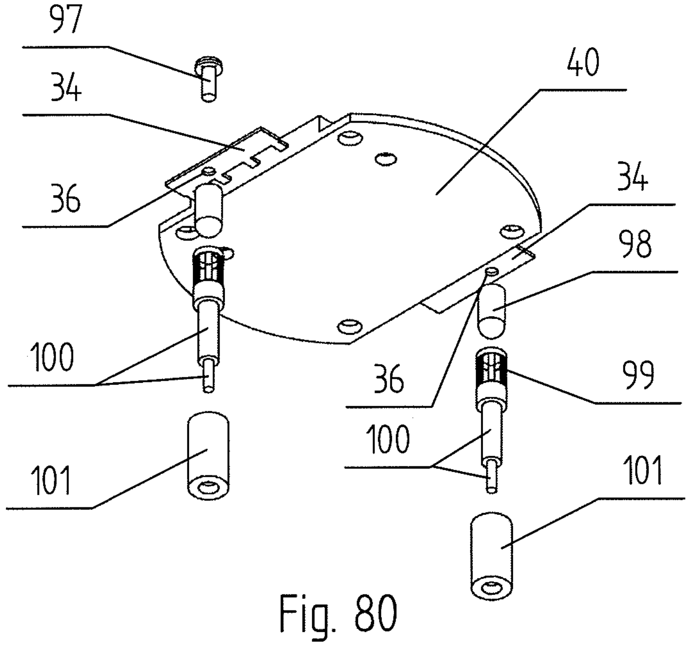
FIG. 80 shows a profile heat radiating plate placed on the profile board powering the LED diode with an exploded state of its two pins in a perspective view from below.

In the second version of the load-bearing and lighting subassembly 1 shown in FIGS. 75-80, in the profile openings of the plates 34 supplying the COB LED diodes 33 of four COB LED modules 29, two screws 97 are screwed into the pins 98, embedded in bushing sockets 99 connected with electric cables 100, which, together with these sockets, are covered by bushing covers 101 which, when connected to each other, function as electrical contact joints 24 described in the first embodiment of the load-bearing and lighting component 1 of this lamp.

In another embodiment of this lighting lamp, not shown, instead of the cooling fan 56, a thermoelectric module known as Peltier Element is used, directly connected to the water radiator 57, achieving the desired effect while significantly reducing noise, and lenses to focus or diffuse the light rays of COB LED diodes 30 in a radius from 20° to 160° are used, the lenses were made of glass or plastic or paraffin or epoxy, achieving similar effects of diffusing or focusing the rays of this light, and moreover, the power supply 87 was mounted inside the rectangular housing 5.

In turn, in the variants of the implementation of these lamps, the supporting cooling plate 12 and its cover 22 are made of steel or titanium, or carbon, or ceramic, copper, epoxy resin or plastic, and cooling is done with glycol, alcohol or oil, also obtaining adequate cooling of COB LED diodes 33 of COB LED modules 29 and thermal paste 23" is replaced with liquid metal or silicone thermally conductive mat.

In another version of this lighting lamp (not shown in the figure), COB LED modules 29 were replaced with several LED modules with higher efficiency, of Mini Cob, MD types and miniature SSL or OLED diodes, mounted on ceramic or aluminium plates, which enabled the selection of parameters lights from a dozen or so LED modules, each of these LED diodes could be electronically controlled independently, and their number is adapted to the parameters and dimensions of the cooling plate, and the LCD displays are replaced with LED or OLED displays. Moreover, it is obvious that the lighting lamp according to the invention can be used independently of the voltage and current parameters in force in a given country.

The invention claimed is:

1. A LED lighting lamp cooled by a liquid agent comprising:

COB LED (chip on board) modules having an LED light source, whose supporting bodies include temperature sensors cooled with a cooling agent, a load-bearing and lighting subassembly (1), having a cooling plate (12) with three threaded mounting openings (13, 14 and 15) arranged transversely, an inner surface (16) having channels (17) for the cooling agent flowing therethrough is permanently and tightly connected with a cover (22) equipped with neodymium magnets (19) magnetically connected to contacting neodymium magnets (53) of holders (44) fixing COB LED modules (29) equipped with COB LED diodes (33) and lenses (51), a cooling subassembly (2) situated above the load-bearing and lighting subassembly (1) including a cooling fan (56) and a water radiator (57) placed thereon and detachably connected thereto, wherein the load-bearing and lighting subassembly (1) and the cooling subassembly (2) are connected to each other by a first connecting pipe set (3) and a second connecting pipe set (4) such that an upper connector (68) of the first connecting pipe set (3) is screwed into the threaded opening (66) of the water chamber (63) of the water radiator, and two additional connectors (69) of the first connecting pipe set (3) are screwed into the threaded openings (14 and 15) of the cooling plate (12) of the load-bearing and lighting subassembly (1), and a threaded connecting pipe (54') of a water pump (55) is screwed into the opening (13), while an upper connection (70) of the second connecting pipe set (4) is screwed into a threaded opening (67) of a second water chamber (64) of the water radiator (57), and a lower connection (71) of the second connecting pipe set (4) is screwed into a threaded connection (72) of a water pump (55), both of the subassemblies (1 and 2) are mounted in a housing (5) with a profile adapted to a shape of the cooling plate (12) and the water radiator (57).

2. The lamp according to claim 1, wherein the cooling plate (12) on the inner surface (16), next to and between the channels (17), has round blind openings (18) with embedded neodymium magnets (19), protruding above the inner surface of the plate, on which the cover (22) is mounted through openings (18') in the cover (22), connected by a layer of glue (23) to the inner surface (16) of the cooling plate, and an outer surface of the cover (22) is covered with a thermally conductive layer (23").

3. The lamp according to claim 1, wherein both in the cooling plate (12) and in the cover (22), between the neodymium magnets (19), there are mounting through openings (20 and 20') in which cables (28) of electrical contact connectors (24) are provided, copper contact plates (25) of the connectors adhere to power plates (34) of the COB LED modules (29) embedded in the mounting holders (44) equipped with neodymium magnets (53), which are connected with the neodymium magnets (19) embedded in the cooling plate (12) and the cover (22) of the load-bearing and lighting subassembly (1), whereby a connection of the contact plates (25) with the power plates (34) causes a current to be supplied to the COB LED modules and illuminating the COB LED diodes (33).

4. The lamp according to claim 1, wherein the mounting holders (44) of the COB LED modules (29) have profiles adapted to profiles of plates (40) giving off heat from the modules, covered on top with a thermally conductive layer (23"), and in their axes of symmetry, the plates have through openings (45) located opposite the COB LED diodes (33) of the COB LED modules (29), and one surface of the mounting holders (44) have profile extractions (46) in which profile housings (30) of the modules are mounted, and opposite flat surfaces (47) on rounded sides have two arched offsets (48) situated opposite each other, between which are mounted a collar (50) of the lens (51) with a paraboloidal profile scattering or concentrating light rays from COB LED diodes (33), and moreover, each of the holders have four corners comprising openings (52) with neodymium magnets (53) embedded therein in contact with the neodymium magnets (19) of the load-bearing and lighting subassembly (1).

5. The lamp according to claim 1, wherein the housing (5) of the load-bearing and lighting subassembly (1) and the cooling subassembly (2) is equipped with power cables (94) connected to an external power supply (87) with an electronic unit and knobs (89) and (90) for controlling a flow of electric current, and the housing (5) further comprises two displays (77) with panels (80) embedded therein.

6. The lamp according to claim 1, wherein the cooling plate (12) and the cover (22) are made of aluminium, steel, titanium, carbon, ceramics, copper, epoxy resin, or plastic, and the cooling agent is water, glycol, alcohol, or oil.

7. The lamp according to claim 2, wherein the thermally conductive layer (23") is a thermally conductive paste, a liquid metal, or a thermally conductive silicone mat.

8. The lamp according to claim 1, wherein the liquid agent is water.

* * * * *